US011473407B2

(12) United States Patent
Tang et al.

(10) Patent No.: US 11,473,407 B2
(45) Date of Patent: Oct. 18, 2022

(54) DETECTING EVENTS IN WELL REPORTS

(71) Applicant: Schlumberger Technology Corporation, Sugar Land, TX (US)

(72) Inventors: Yuxin Tang, Beijing (CN); Qing Liu, Beijing (CN); Paul Bolchover, Beijing (CN); Di Cao, Beijing (CN); Jean-Pierre Poyet, Houston, TX (US); Benoit Foubert, Houston, TX (US); Ping Zhang, Albany, CA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 543 days.

(21) Appl. No.: 16/303,139

(22) PCT Filed: Jun. 1, 2017

(86) PCT No.: PCT/US2017/035360
§ 371 (c)(1),
(2) Date: Nov. 19, 2018

(87) PCT Pub. No.: WO2017/210379
PCT Pub. Date: Dec. 7, 2017

(65) Prior Publication Data
US 2020/0332627 A1    Oct. 22, 2020

(30) Foreign Application Priority Data
Jun. 3, 2016    (WO) ................ PCT/CN2016/084802

(51) Int. Cl.
*E21B 43/00*    (2006.01)
*G06F 40/186*   (2020.01)
*G06F 40/205*   (2020.01)

(52) U.S. Cl.
CPC ............. *E21B 43/00* (2013.01); *G06F 40/186* (2020.01); *G06F 40/205* (2020.01); *E21B 2200/22* (2020.05)

(58) Field of Classification Search
CPC ...... E21B 43/00; E21B 2200/22; E21B 41/00; E21B 33/00; E21B 41/0099;
(Continued)

(56) References Cited

U.S. PATENT DOCUMENTS 9,322,247 B2    4/2016   Rojas et al.
2005/0236184 A1  10/2005  Veeningen et al.
(Continued)

FOREIGN PATENT DOCUMENTS

CA    2709369 A      1/2011
CN    101519960 A    9/2009
(Continued)

OTHER PUBLICATIONS

Esmael, Bilal et al., "Automated Operations Classification using Text Mining Techniques," 2010 Conference Paper PACIIA, China (Year: 2010).*
(Continued)

*Primary Examiner* — Steven W Crabb
(74) *Attorney, Agent, or Firm* — Alec J. McGinn

(57) ABSTRACT

A system, computer-readable medium, and method for identifying drilling events in drilling reports, of which the method includes receiving one or more drilling reports including text data representing one or more observations recorded during a drilling activity, identifying a drilling event, a drilling activity, or both from the text data using a model, obtaining feedback based at least in part on the drilling event, the drilling activity, or both that were identified, and training the model based on the feedback.

12 Claims, 15 Drawing Sheets

(58) Field of Classification Search
CPC .. E21B 41/0092; G06F 40/186; G06F 40/205; G06F 40/279
See application file for complete search history.

(56) References Cited

U.S. PATENT DOCUMENTS

| | | | |
|---|---|---|---|
| 2007/0199721 A1 | 8/2007 | Givens et al. | |
| 2009/0043555 A1* | 2/2009 | Busby | E21B 43/00 703/10 |
| 2011/0066585 A1 | 3/2011 | Subrahmanyam et al. | |
| 2011/0213777 A1 | 9/2011 | Sun | |
| 2012/0123756 A1 | 5/2012 | Wang et al. | |
| 2012/0292110 A1 | 11/2012 | Downton | |
| 2013/0080062 A1* | 3/2013 | Aamodt | G06N 5/022 702/9 |
| 2014/0110167 A1 | 4/2014 | Goebel et al. | |
| 2014/0188892 A1* | 7/2014 | Ludvigsen | G06Q 50/01 707/741 |
| 2015/0234954 A1 | 8/2015 | Samuel et al. | |
| 2015/0300151 A1* | 10/2015 | Mohaghegh | E21B 47/10 702/9 |

FOREIGN PATENT DOCUMENTS

| | | |
|---|---|---|
| CN | 102128022 A | 7/2011 |
| CN | 102930372 A | 2/2013 |
| CN | 103649460 A | 3/2014 |
| CN | 103958828 A | 7/2014 |
| CN | 104024572 A | 9/2014 |
| CN | 104806226 A | 7/2015 |
| CN | 105074128 A | 11/2015 |
| CN | 105102760 A | 11/2015 |
| CN | 105612538 A | 5/2016 |
| GB | 0822951 | 1/2009 |
| TW | 200601114 A | 1/2006 |
| WO | 2013192365 A1 | 12/2013 |
| WO | 2014/160348 A2 | 10/2014 |
| WO | 2015/026502 A1 | 2/2015 |

OTHER PUBLICATIONS

Opeyemi Bello, et al., "Application of Artificial Intelligence Techniques in Drilling System Design and Operations: A State of the Art Review and Future Research Pathways," SPE-184320-MS (Year: 2016).*
Esmael, et al., "A Hybrid Multiple Classifier System for Recognizing Usual and Unusual Drilling Events," 2013 IEEE Inter national Instrumentation and Measurement Technology Conference, May 13, 2012, pp. 1754-1758.
Sidahmed, et al., "Augmenting Operations Monitoring by Mining Unstructured Drilling Reports," SPE Digital Energy Conference and Exhibition, Mar. 3-5, 2015, The Woodlands, TX USA.
Search Report for the counterpart European patent application 17807453.0 dated Jan. 31, 2020.
International Search Report for the priority International patent application PCT/CN2016/084802 dated Feb. 14, 2017.
International Search Report and Written Opinion for the equivalent International patent application PCT/US2017/035360 dated Aug. 24, 2017.
International Preliminary Report on Patentability for the priority International patent application PCT/CN2016/084802 dated Dec. 13, 2018.
International Preliminary Report on Patentability for the equivalent International patent application PCT/US2017/035360 dated Dec. 13, 2018.

* cited by examiner

DETECTING EVENTS IN WELL REPORTS

CROSS-REFERENCE TO RELATED APPLICATIONS

This application claims the benefit of, and priority to PCT Patent Application No. PCT/CN2016/084802, filed on Jun. 3, 2016, which application is incorporated herein by this reference in its entirety.

BACKGROUND

Offset well data is used as a resource for designing wells. Such offset well data provides insights into what occurred in the past while drilling nearby wells. Often, offset well data can be analyzed and used to predict suitable well geometries, risks of non-productive time, hazards, etc. in a given area.

A variety of reports are constructed during drilling of a well. These reports are saved and become the offset well data used for evaluating well plans for subsequent wells. For example, some of these reports are written at the end of well construction, while others can be on-demand, intermittent, etc., based on a variety of factors. In addition to numerical data, the reports may also contain free text. The free text may contain a description of abnormal events correlated to drilling depth, well geometry, rock type, and activities taken before and after the events took place etc.

The free-text component of the reports can provide a large proportion of the offset well data that is useful to subsequent drillers. However, because it is often free text, these reports are subject to differences in word-choice, etc., and can thus be difficult to access readily when drilling subsequent wells.

SUMMARY

Embodiments of the disclosure may provide a method for identifying drilling events in drilling reports, of which the method includes receiving one or more drilling reports including text data representing one or more observations recorded during a drilling activity, identifying a drilling event, a drilling activity, or both from the text data using a model, obtaining feedback based at least in part on the drilling event, the drilling activity, or both that were identified, and training the model based on the feedback.

Embodiments of the disclosure may also provide a computing system including one or more processors, and a memory system including one or more non-transitory, computer-readable media storing instructions that, when executed by at least one of the one or more processors, cause the computing system to perform operations. The operations include receiving one or more drilling reports including text data representing one or more observations recorded during a drilling activity, identifying a drilling event, a drilling activity, or both from the text data using a model, obtaining feedback based at least in part on the drilling event, the drilling activity, or both that were identified, and training the model based on the feedback.

Embodiments of the disclosure may also provide a non-transitory, computer-readable medium storing instructions that, when executed by at least one processor of a computing system, cause the computing system to perform operations. The operations include receiving one or more drilling reports including text data representing one or more observations recorded during a drilling activity, identifying a drilling event, a drilling activity, or both from the text data using a model, obtaining feedback based at least in part on the drilling event, the drilling activity, or both that were identified, and training the model based on the feedback.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

The following description includes embodiments of the best mode presently contemplated for practicing the described implementations. This description is not to be taken in a limiting sense, but rather is made merely for the purpose of describing the general principles of the implementations. The scope of the described implementations should be ascertained with reference to the issued claims.

Well Planning and Drilling Systems

Well planning is a process by which a path of a well can be mapped, so as to reach a reservoir, for example, to produce fluids therefrom. As an example, constraints can be imposed on a design of a well, for example, a well trajectory may be constrained via one or more physical phenomena that may impact viability of a bore, ease of drilling, etc. Thus, for example, one or more constraints may be imposed based at least in part on known geology of a subterranean domain or, for example, presence of other wells in the area (e.g., collision avoidance). As an example, one or more other constraints may be imposed, for example, consider one or more constraints germane to capabilities of tools being used and/or one or more constraints related to drilling time and risk tolerance.

As an example, a well plan can be generated based at least in part on imposed constraints and known information. As an example, a well plan may be provided to a well owner, approved, and then implemented by a drilling service provider (e.g., a directional driller or "DD").

As an example, a well design system can account for one or more capabilities of a drilling system or drilling systems that may be utilized at a wellsite. As an example, a drilling engineer may be called upon to take such capabilities into account, for example, as one or more of various designs and specifications are created.

As an example, a well design system, which may be a well planning system, may take into account automation. For example, where a wellsite includes wellsite equipment that can be automated, for example, via a local and/or a remote automation command, a well plan may be generated in digital form that can be utilized in a well drilling system where at least some amount of automation is possible and desired. For example, a digital well plan can be accessible by a well drilling system where information in the digital well plan can be utilized via one or more automation mechanisms of the well drilling system to automate one or more operations at a wellsite.

Figure 1:
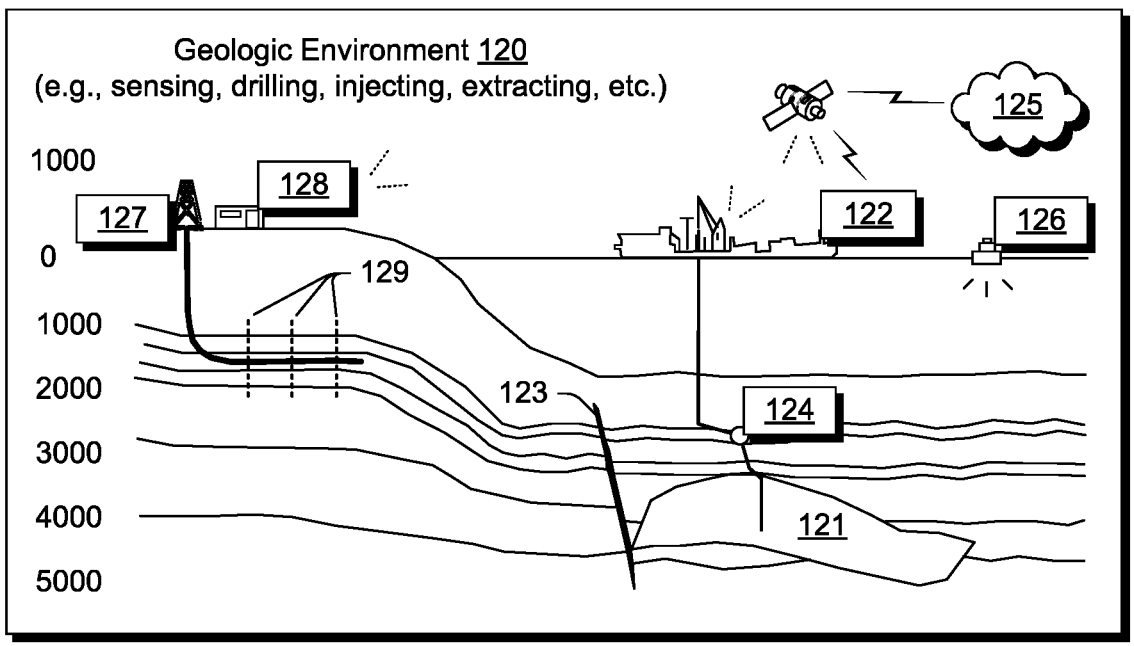
FIG. 1 illustrates examples of equipment in a geologic environment.
Figure 1:
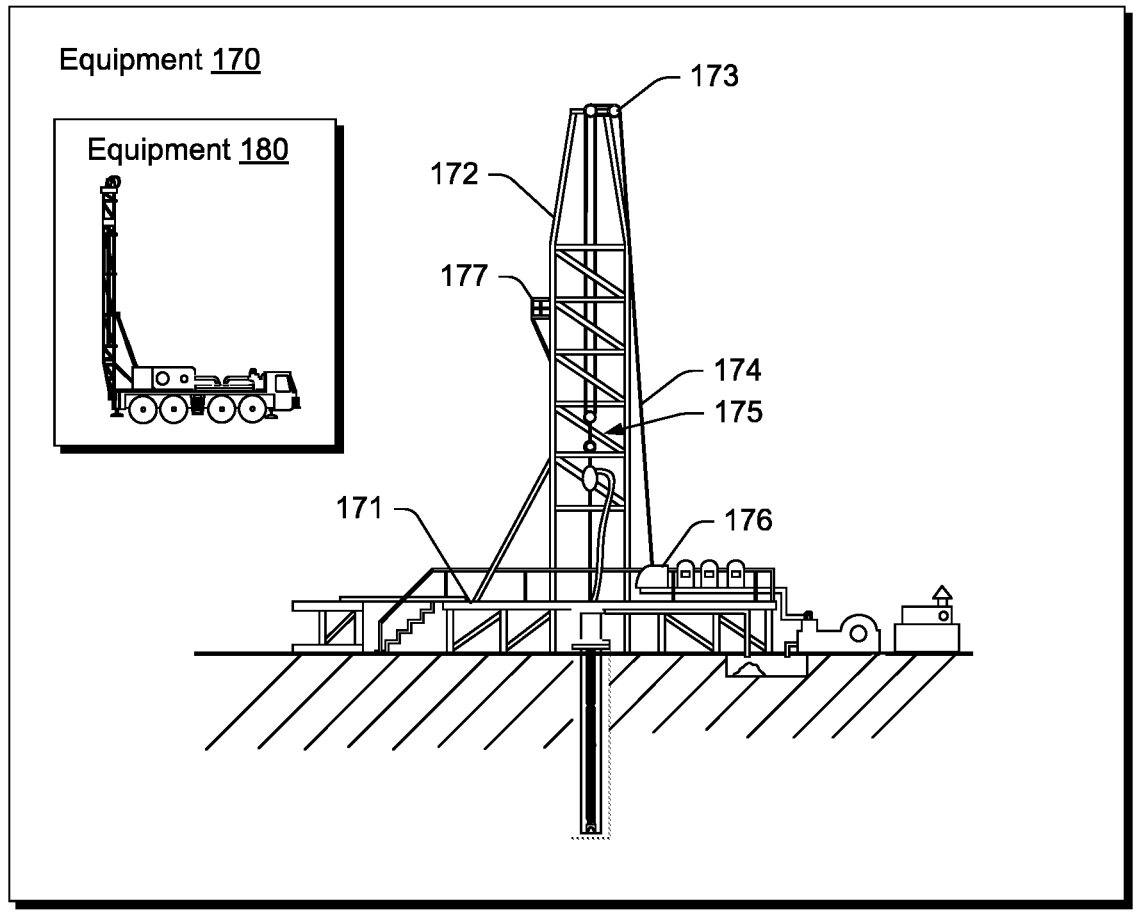

FIG. 1 shows an example of a geologic environment 120. In FIG. 1, the geologic environment 120 may be a sedimentary basin that includes layers (e.g., stratification) that include a reservoir 121 and that may be, for example, intersected by a fault 123 (e.g., or faults). As an example, the geologic environment 120 may be outfitted with any of a variety of sensors, detectors, actuators, etc. For example, equipment 122 may include communication circuitry to receive and/or to transmit information with respect to one or more networks 125. Such information may include information associated with downhole equipment 124, which may be equipment to acquire information, to assist with resource recovery, etc. Other equipment 126 may be located remote from a well site and include sensing, detecting, emitting or other circuitry. Such equipment may include storage and communication circuitry to store and to communicate data, instructions, etc. As an example, one or more pieces of equipment may provide for measurement, collection, communication, storage, analysis, etc. of data (e.g., for one or more produced resources, etc.). As an example, one or more satellites may be provided for purposes of communications, data acquisition, geolocation, etc. For example, FIG. 1 shows a satellite in communication with the network 125 that may be configured for communications, noting that the satellite may additionally or alternatively include circuitry for imagery (e.g., spatial, spectral, temporal, radiometric, etc.).

FIG. 1 also shows the geologic environment 120 as optionally including equipment 127 and 128 associated with a well that includes a substantially horizontal portion that may intersect with one or more fractures 129. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 127 and/or 128 may include components, a system, systems, etc. for fracturing, seismic sensing, analysis of seismic data, assessment of one or more fractures, injection, production, etc. As an example, the equipment 127 and/or 128 may provide for measurement, collection, communication, storage, analysis, etc. of data such as, for example, production data (e.g., for one or more produced resources). As an example, one or more satellites may be provided for purposes of communications, data acquisition, etc.

FIG. 1 also shows an example of equipment 170 and an example of equipment 180. Such equipment, which may be systems of components, may be suitable for use in the geologic environment 120. While the equipment 170 and 180 are illustrated as land-based, various components may be suitable for use in an offshore system. As shown in FIG. 1, the equipment 180 can be mobile as carried by a vehicle; noting that the equipment 170 can be assembled, disassembled, transported and re-assembled, etc.

The equipment 170 includes a platform 171, a derrick 172, a crown block 173, a line 174, a traveling block assembly 175, drawworks 176 and a landing 177 (e.g., a monkeyboard). As an example, the line 174 may be controlled at least in part via the drawworks 176 such that the traveling block assembly 175 travels in a vertical direction with respect to the platform 171. For example, by drawing the line 174 in, the drawworks 176 may cause the line 174 to run through the crown block 173 and lift the traveling block assembly 175 skyward away from the platform 171; whereas, by allowing the line 174 out, the drawworks 176 may cause the line 174 to run through the crown block 173 and lower the traveling block assembly 175 toward the platform 171. Where the traveling block assembly 175 carries pipe (e.g., casing, etc.), tracking of movement of the traveling block 175 may provide an indication as to how much pipe has been deployed.

A derrick can be a structure used to support a crown block and a traveling block operatively coupled to the crown block at least in part via line. A derrick may be pyramidal in shape and offer a suitable strength-to-weight ratio. A derrick may be movable as a unit or in a piece by piece manner (e.g., to be assembled and disassembled).

As an example, drawworks may include a spool, brakes, a power source and assorted auxiliary devices. Drawworks may controllably reel out and reel in line. Line may be reeled over a crown block and coupled to a traveling block to gain mechanical advantage in a "block and tackle" or "pulley" fashion. Reeling out and in of line can cause a traveling block (e.g., and whatever may be hanging underneath it), to be lowered into or raised out of a bore. Reeling out of line may be powered by gravity and reeling in by a motor, an engine, etc. (e.g., an electric motor, a diesel engine, etc.).

As an example, a crown block can include a set of pulleys (e.g., sheaves) that can be located at or near a top of a derrick or a mast, over which line is threaded. A traveling block can include a set of sheaves that can be moved up and down in a derrick or a mast via line threaded in the set of sheaves of the traveling block and in the set of sheaves of a crown block. A crown block, a traveling block and a line can form a pulley system of a derrick or a mast, which may enable handling of heavy loads (e.g., drillstring, pipe, casing, liners, etc.) to be lifted out of or lowered into a bore. As an example, line may be about a centimeter to about five centimeters in diameter as, for example, steel cable. Through use of a set of sheaves, such line may carry loads heavier than the line could support as a single strand.

As an example, a derrick person may be a rig crew member that works on a platform attached to a derrick or a mast. A derrick can include a landing on which a derrick person may stand. As an example, such a landing may be about 10 meters or more above a rig floor. In an operation referred to as trip out of the hole (TOH), a derrick person may wear a safety harness that enables leaning out from the work landing (e.g., monkeyboard) to reach pipe in located at or near the center of a derrick or a mast and to throw a line around the pipe and pull it back into its storage location (e.g., fingerboards), for example, until it a time at which it may be desirable to run the pipe back into the bore. As an example, a rig may include automated pipe-handling equipment such that the derrick person controls the machinery rather than physically handling the pipe.

As an example, a trip may refer to the act of pulling equipment from a bore and/or placing equipment in a bore. As an example, equipment may include a drillstring that can be pulled out of the hole and/or place or replaced in the hole. As an example, a pipe trip may be performed where a drill bit has dulled or has otherwise ceased to drill efficiently and is to be replaced.

Figure 2:
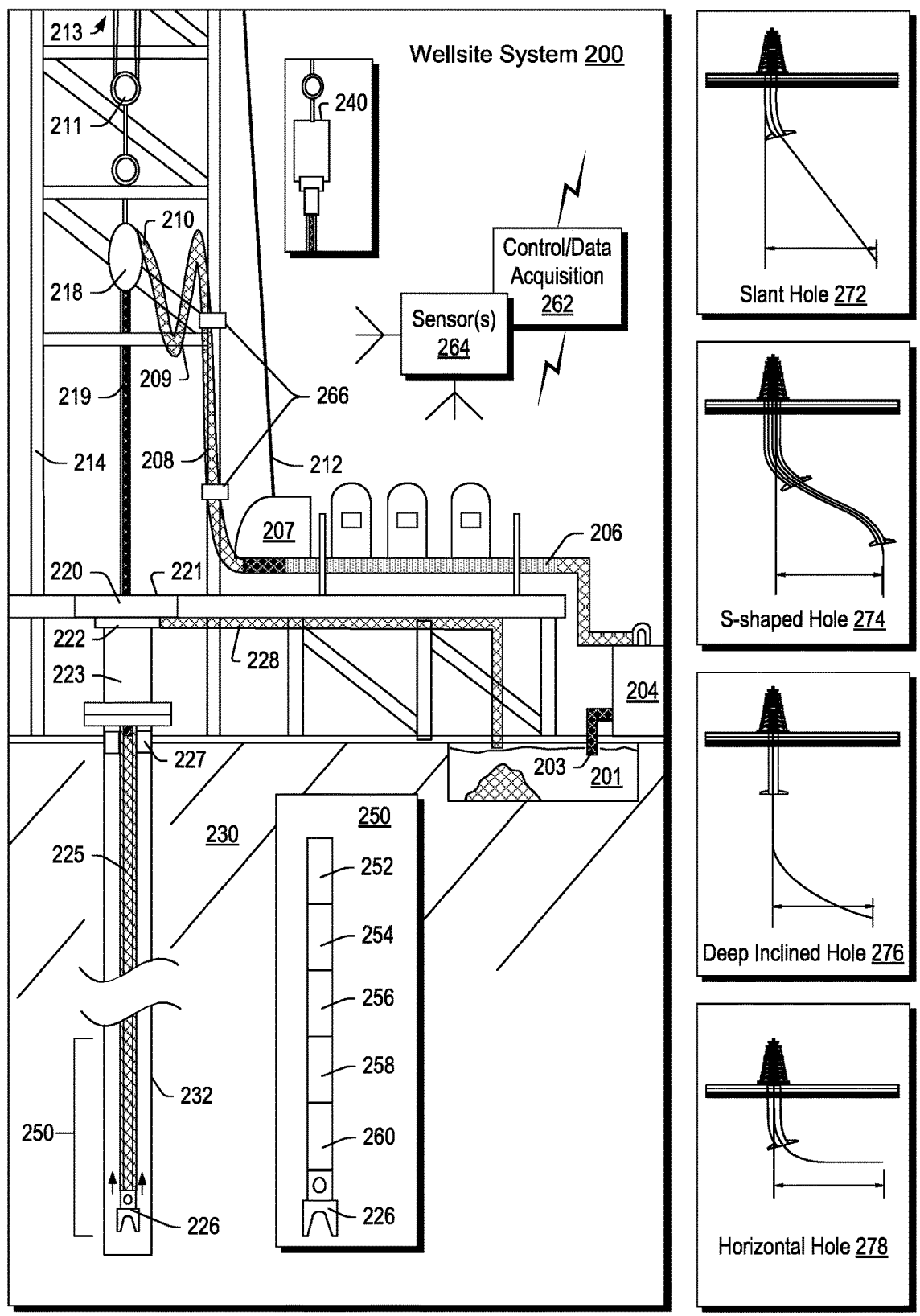
FIG. 2 illustrates an example of a system and examples of types of holes.

FIG. 2 shows an example of a wellsite system 200 (e.g., at a wellsite that may be onshore or offshore). As shown, the wellsite system 200 can include a mud tank 201 for holding mud and other material (e.g., where mud can be a drilling fluid), a suction line 203 that serves as an inlet to a mud pump 204 for pumping mud from the mud tank 201 such that mud flows to a vibrating hose 206, a drawworks 207 for winching drill line or drill lines 212, a standpipe 208 that receives mud from the vibrating hose 206, a kelly hose 209 that receives mud from the standpipe 208, a gooseneck or goosenecks 210, a traveling block 211, a crown block 213 for carrying the traveling block 211 via the drill line or drill lines 212 (see, e.g., the crown block 173 of FIG. 1), a derrick 214 (see, e.g., the derrick 172 of FIG. 1), a kelly 218 or a top drive 240, a kelly drive bushing 219, a rotary table 220, a drill floor 221, a bell nipple 222, one or more blowout preventors (BOPS) 223, a drillstring 225, a drill bit 226, a casing head 227 and a flow pipe 228 that carries mud and other material to, for example, the mud tank 201.

In the example system of FIG. 2, a borehole 232 is formed in subsurface formations 230 by rotary drilling; noting that various example embodiments may also use directional drilling.

As shown in the example of FIG. 2, the drillstring 225 is suspended within the borehole 232 and has a drillstring assembly 250 that includes the drill bit 226 at its lower end. As an example, the drillstring assembly 250 may be a bottom hole assembly (BHA).

The wellsite system 200 can provide for operation of the drillstring 225 and other operations. As shown, the wellsite system 200 includes the platform 211 and the derrick 214 positioned over the borehole 232. As mentioned, the wellsite system 200 can include the rotary table 220 where the drillstring 225 pass through an opening in the rotary table 220.

As shown in the example of FIG. 2, the wellsite system 200 can include the kelly 218 and associated components, etc., or a top drive 240 and associated components. As to a kelly example, the kelly 218 may be a square or hexagonal metal/alloy bar with a hole drilled therein that serves as a mud flow path. The kelly 218 can be used to transmit rotary motion from the rotary table 220 via the kelly drive bushing 219 to the drillstring 225, while allowing the drillstring 225 to be lowered or raised during rotation. The kelly 218 can pass through the kelly drive bushing 219, which can be driven by the rotary table 220. As an example, the rotary table 220 can include a master bushing that operatively couples to the kelly drive bushing 219 such that rotation of the rotary table 220 can turn the kelly drive bushing 219 and hence the kelly 218. The kelly drive bushing 219 can include an inside profile matching an outside profile (e.g., square, hexagonal, etc.) of the kelly 218; however, with slightly larger dimensions so that the kelly 218 can freely move up and down inside the kelly drive bushing 219.

As to a top drive example, the top drive 240 can provide functions performed by a kelly and a rotary table. The top drive 240 can turn the drillstring 225. As an example, the top drive 240 can include one or more motors (e.g., electric and/or hydraulic) connected with appropriate gearing to a short section of pipe called a quill, that in turn may be screwed into a saver sub or the drillstring 225 itself. The top drive 240 can be suspended from the traveling block 211, so the rotary mechanism is free to travel up and down the derrick 214. As an example, a top drive 240 may allow for drilling to be performed with more joint stands than a kelly/rotary table approach.

In the example of FIG. 2, the mud tank 201 can hold mud, which can be one or more types of drilling fluids. As an example, a wellbore may be drilled to produce fluid, inject fluid or both (e.g., hydrocarbons, minerals, water, etc.).

In the example of FIG. 2, the drillstring 225 (e.g., including one or more downhole tools) may be composed of a series of pipes threadably connected together to form a long tube with the drill bit 226 at the lower end thereof. As the drillstring 225 is advanced into a wellbore for drilling, at some point in time prior to or coincident with drilling, the mud may be pumped by the pump 204 from the mud tank 201 (e.g., or other source) via a the lines 206, 208 and 209 to a port of the kelly 218 or, for example, to a port of the top drive 240. The mud can then flow via a passage (e.g., or passages) in the drillstring 225 and out of ports located on the drill bit 226 (see, e.g., a directional arrow). As the mud exits the drillstring 225 via ports in the drill bit 226, it can then circulate upwardly through an annular region between an outer surface(s) of the drillstring 225 and surrounding wall(s) (e.g., open borehole, casing, etc.), as indicated by directional arrows. In such a manner, the mud lubricates the drill bit 226 and carries heat energy (e.g., frictional or other energy) and formation cuttings to the surface where the mud (e.g., and cuttings) may be returned to the mud tank 201, for example, for recirculation (e.g., with processing to remove cuttings, etc.).

The mud pumped by the pump 204 into the drillstring 225 may, after exiting the drillstring 225, form a mudcake that lines the wellbore which, among other functions, may reduce friction between the drillstring 225 and surrounding wall(s) (e.g., borehole, casing, etc.). A reduction in friction may facilitate advancing or retracting the drillstring 225. During a drilling operation, the entire drill string 225 may be pulled from a wellbore and optionally replaced, for example, with a new or sharpened drill bit, a smaller diameter drill string, etc. As mentioned, the act of pulling a drill string out of a hole or replacing it in a hole is referred to as tripping. A trip may be referred to as an upward trip or an outward trip or as a downward trip or an inward trip depending on trip direction.

As an example, consider a downward trip where upon arrival of the drill bit 226 of the drill string 225 at a bottom of a wellbore, pumping of the mud commences to lubricate the drill bit 226 for purposes of drilling to enlarge the wellbore. As mentioned, the mud can be pumped by the pump 204 into a passage of the drillstring 225 and, upon filling of the passage, the mud may be used as a transmission medium to transmit energy, for example, energy that may encode information as in mud-pulse telemetry.

As an example, mud-pulse telemetry equipment may include a downhole device configured to effect changes in pressure in the mud to create an acoustic wave or waves upon which information may modulated. In such an example, information from downhole equipment (e.g., one or more modules of the drillstring 225) may be transmitted uphole to an uphole device, which may relay such information to other equipment for processing, control, etc.

As an example, telemetry equipment may operate via transmission of energy via the drillstring 225 itself. For example, consider a signal generator that imparts coded energy signals to the drillstring 225 and repeaters that may receive such energy and repeat it to further transmit the coded energy signals (e.g., information, etc.).

As an example, the drillstring 225 may be fitted with telemetry equipment 252 that includes a rotatable drive shaft, a turbine impeller mechanically coupled to the drive shaft such that the mud can cause the turbine impeller to rotate, a modulator rotor mechanically coupled to the drive shaft such that rotation of the turbine impeller causes said modulator rotor to rotate, a modulator stator mounted adjacent to or proximate to the modulator rotor such that rotation of the modulator rotor relative to the modulator stator creates pressure pulses in the mud, and a controllable brake for selectively braking rotation of the modulator rotor to modulate pressure pulses. In such example, an alternator may be coupled to the aforementioned drive shaft where the alternator includes at least one stator winding electrically coupled to a control circuit to selectively short the at least one stator winding to electromagnetically brake the alternator and thereby selectively brake rotation of the modulator rotor to modulate the pressure pulses in the mud.

In the example of FIG. 2, an uphole control and/or data acquisition system 262 may include circuitry to sense pressure pulses generated by telemetry equipment 252 and, for example, communicate sensed pressure pulses or information derived therefrom for process, control, etc.

The assembly 250 of the illustrated example includes a logging-while-drilling (LWD) module 254, a measuring-while-drilling (MWD) module 256, an optional module 258, a roto-steerable system and motor 260, and the drill bit 226.

The LWD module 254 may be housed in a suitable type of drill collar and can contain one or a plurality of selected types of logging tools. It will also be understood that more than one LWD and/or MWD module can be employed, for example, as represented at by the module 256 of the drillstring assembly 250. Where the position of an LWD module is mentioned, as an example, it may refer to a module at the position of the LWD module 254, the module 256, etc. An LWD module can include capabilities for measuring, processing, and storing information, as well as for communicating with the surface equipment. In the illustrated example, the LWD module 254 may include a seismic measuring device.

The MWD module 256 may be housed in a suitable type of drill collar and can contain one or more devices for measuring characteristics of the drillstring 225 and the drill bit 226. As an example, the MWD tool 254 may include equipment for generating electrical power, for example, to power various components of the drillstring 225. As an example, the MWD tool 254 may include the telemetry equipment 252, for example, where the turbine impeller can generate power by flow of the mud; it being understood that other power and/or battery systems may be employed for purposes of powering various components. As an example, the MWD module 256 may include one or more of the following types of measuring devices: a weight-on-bit measuring device, a torque measuring device, a vibration measuring device, a shock measuring device, a stick slip measuring device, a direction measuring device, and an inclination measuring device.

FIG. 2 also shows some examples of types of holes that may be drilled. For example, consider a slant hole 272, an S-shaped hole 274, a deep inclined hole 276 and a horizontal hole 278.

As an example, a drilling operation can include directional drilling where, for example, at least a portion of a well includes a curved axis. For example, consider a radius that defines curvature where an inclination with regard to the vertical may vary until reaching an angle between about 30 degrees and about 60 degrees or, for example, an angle to about 90 degrees or possibly greater than about 90 degrees.

As an example, a directional well can include several shapes where each of the shapes may aim to meet particular operational demands. As an example, a drilling process may be performed on the basis of information as and when it is relayed to a drilling engineer. As an example, inclination and/or direction may be modified based on information received during a drilling process.

As an example, deviation of a bore may be accomplished in part by use of a downhole motor and/or a turbine. As to a motor, for example, a drillstring can include a positive displacement motor (PDM).

As an example, a system may be a steerable system and include equipment to perform method such as geosteering. As an example, a steerable system can include a PDM or of a turbine on a lower part of a drillstring which, just above a drill bit, a bent sub can be mounted. As an example, above a PDM, MWD equipment that provides real time or near real time data of interest (e.g., inclination, direction, pressure, temperature, real weight on the drill bit, torque stress, etc.) and/or LWD equipment may be installed. As to the latter, LWD equipment can make it possible to send to the surface various types of data of interest, including for example, geological data (e.g., gamma ray log, resistivity, density and sonic logs, etc.).

The coupling of sensors providing information on the course of a well trajectory, in real time or near real time, with, for example, one or more logs characterizing the formations from a geological viewpoint, can allow for implementing a geosteering method. Such a method can include navigating a subsurface environment, for example, to follow a desired route to reach a desired target or targets.

As an example, a drillstring can include an azimuthal density neutron (AND) tool for measuring density and porosity; a MWD tool for measuring inclination, azimuth and shocks; a compensated dual resistivity (CDR) tool for measuring resistivity and gamma ray related phenomena; one or more variable gauge stabilizers; one or more bend joints; and a geosteering tool, which may include a motor and optionally equipment for measuring and/or responding to one or more of inclination, resistivity and gamma ray related phenomena.

As an example, geosteering can include intentional directional control of a wellbore based on results of downhole geological logging measurements in a manner that aims to keep a directional wellbore within a desired region, zone (e.g., a pay zone), etc. As an example, geosteering may include directing a wellbore to keep the wellbore in a particular section of a reservoir, for example, to minimize gas and/or water breakthrough and, for example, to maximize economic production from a well that includes the wellbore.

Referring again to FIG. 2, the wellsite system 200 can include one or more sensors 264 that are operatively coupled to the control and/or data acquisition system 262. As an example, a sensor or sensors may be at surface locations. As an example, a sensor or sensors may be at downhole locations. As an example, a sensor or sensors may be at one or more remote locations that are not within a distance of the order of about one hundred meters from the wellsite system 200. As an example, a sensor or sensor may be at an offset wellsite where the wellsite system 200 and the offset wellsite are in a common field (e.g., oil and/or gas field).

As an example, one or more of the sensors 264 can be provided for tracking pipe, tracking movement of at least a portion of a drillstring, etc.

As an example, the system 200 can include one or more sensors 266 that can sense and/or transmit signals to a fluid conduit such as a drilling fluid conduit (e.g., a drilling mud conduit). For example, in the system 200, the one or more sensors 266 can be operatively coupled to portions of the standpipe 208 through which mud flows. As an example, a downhole tool can generate pulses that can travel through the mud and be sensed by one or more of the one or more sensors 266. In such an example, the downhole tool can include associated circuitry such as, for example, encoding circuitry that can encode signals, for example, to reduce demands as to transmission. As an example, circuitry at the surface may include decoding circuitry to decode encoded information transmitted at least in part via mud-pulse telemetry. As an example, circuitry at the surface may include encoder circuitry and/or decoder circuitry and circuitry downhole may include encoder circuitry and/or decoder circuitry. As an example, the system 200 can include a transmitter that can generate signals that can be transmitted downhole via mud (e.g., drilling fluid) as a transmission medium.

As an example, one or more portions of a drillstring may become stuck. The term stuck can refer to one or more of varying degrees of inability to move or remove a drillstring from a bore. As an example, in a stuck condition, it might be possible to rotate pipe or lower it back into a bore or, for example, in a stuck condition, there may be an inability to move the drillstring axially in the bore, though some amount of rotation may be possible. As an example, in a stuck condition, there may be an inability to move at least a portion of the drillstring axially and rotationally.

As to the term "stuck pipe", the can refer to a portion of a drillstring that cannot be rotated or moved axially. As an example, a condition referred to as "differential sticking" can be a condition whereby the drillstring cannot be moved (e.g., rotated or reciprocated) along the axis of the bore. Differential sticking may occur when high-contact forces caused by low reservoir pressures, high wellbore pressures, or both, are exerted over a sufficiently large area of the drillstring. Differential sticking can have time and financial cost.

As an example, a sticking force can be a product of the differential pressure between the wellbore and the reservoir and the area that the differential pressure is acting upon. This means that a relatively low differential pressure (delta p) applied over a large working area can be just as effective in sticking pipe as can a high differential pressure applied over a small area.

As an example, a condition referred to as "mechanical sticking" can be a condition where limiting or prevention of motion of the drillstring by a mechanism other than differential pressure sticking occurs. Mechanical sticking can be caused, for example, by one or more of junk in the hole, wellbore geometry anomalies, cement, keyseats or a buildup of cuttings in the annulus.

Figure 3:
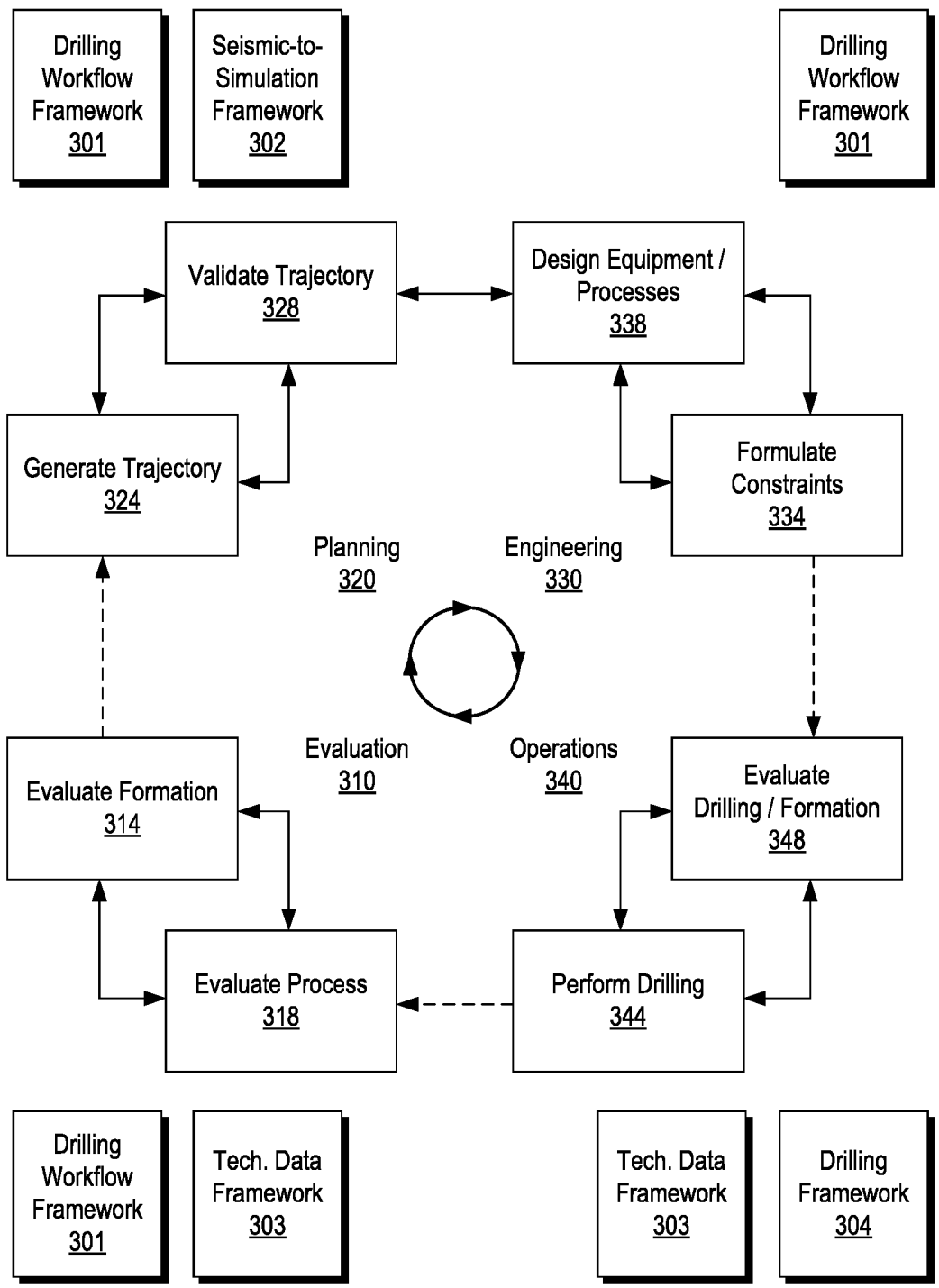
FIG. 3 illustrates an example of a system.

FIG. 3 shows an example of a system 300 that includes various equipment for evaluation 310, planning 320, engineering 330 and operations 340. For example, a drilling workflow framework 301, a seismic-to-simulation framework 302, a technical data framework 303 and a drilling framework 304 may be implemented to perform one or more processes such as a evaluating a formation 314, evaluating a process 318, generating a trajectory 324, validating a trajectory 328, formulating constraints 334, designing equipment and/or processes based at least in part on constraints 338, performing drilling 344 and evaluating drilling and/or formation 348.

In the example of FIG. 3, the seismic-to-simulation framework 302 can be, for example, the PETREL® framework (Schlumberger Limited, Houston, Tex.) and the technical data framework 303 can be, for example, the TECHLOG® framework (Schlumberger Limited, Houston, Tex.).

As an example, a framework can include entities that may include earth entities, geological objects or other objects such as wells, surfaces, reservoirs, etc. Entities can include virtual representations of actual physical entities that are reconstructed for purposes of one or more of evaluation, planning, engineering, operations, etc.

Entities may include entities based on data acquired via sensing, observation, etc. (e.g., seismic data and/or other information). An entity may be characterized by one or more properties (e.g., a geometrical pillar grid entity of an earth model may be characterized by a porosity property). Such properties may represent one or more measurements (e.g., acquired data), calculations, etc.

A framework may be an object-based framework. In such a framework, entities may include entities based on predefined classes, for example, to facilitate modeling, analysis, simulation, etc. A commercially available example of an object-based framework is the MICROSOFT™ .NET™ framework (Redmond, Wash.), which provides a set of extensible object classes. In the .NET™ framework, an object class encapsulates a module of reusable code and associated data structures. Object classes can be used to instantiate object instances for use in by a program, script, etc. For example, borehole classes may define objects for representing boreholes based on well data.

As an example, a framework can include an analysis component that may allow for interaction with a model or model-based results (e.g., simulation results, etc.). As to simulation, a framework may operatively link to or include a simulator such as the ECLIPSE® reservoir simulator (Schlumberger Limited, Houston Tex.), the INTERSECT® reservoir simulator (Schlumberger Limited, Houston Tex.), etc.

The aforementioned PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, well engineers, reservoir engineers, etc.) can develop collaborative workflows and integrate operations to streamline processes. Such a framework may be considered an application and may be considered a data-driven application (e.g., where data is input for purposes of modeling, simulating, etc.).

As an example, one or more frameworks may be interoperative and/or run upon one or another. As an example, consider the commercially available framework environment marketed as the OCEAN® framework environment (Schlumberger Limited, Houston, Tex.), which allows for integration of add-ons (or plug-ins) into a PETREL® framework workflow. The OCEAN® framework environment leverages .NET™ tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

As an example, a framework can include a model simulation layer along with a framework services layer, a framework core layer and a modules layer. The framework may include the commercially available OCEAN® framework where the model simulation layer can include or operatively link to the commercially available PETREL® model-centric software package that hosts OCEAN® framework applications. In an example embodiment, the PETREL® software may be considered a data-driven application. The PETREL® software can include a framework for model building and visualization. Such a model may include one or more grids.

As an example, the model simulation layer may provide domain objects, act as a data source, provide for rendering and provide for various user interfaces. Rendering may provide a graphical environment in which applications can display their data while the user interfaces may provide a common look and feel for application user interface components.

As an example, domain objects can include entity objects, property objects and optionally other objects. Entity objects may be used to geometrically represent wells, surfaces, reservoirs, etc., while property objects may be used to provide property values as well as data versions and display parameters. For example, an entity object may represent a well where a property object provides log information as well as version information and display information (e.g., to display the well as part of a model).

As an example, data may be stored in one or more data sources (or data stores, generally physical data storage devices), which may be at the same or different physical sites and accessible via one or more networks. As an example, a model simulation layer may be configured to model projects. As such, a particular project may be stored where stored project information may include inputs, models, results and cases. Thus, upon completion of a modeling session, a user may store a project. At a later time, the project can be accessed and restored using the model simulation layer, which can recreate instances of the relevant domain objects.

As an example, the system 300 may be used to perform one or more workflows. A workflow may be a process that includes a number of worksteps. A workstep may operate on data, for example, to create new data, to update existing data, etc. As an example, a workflow may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable at least in part in the PETREL® software, for example, that operates on seismic data, seismic attribute(s), etc.

As an example, seismic data can be data acquired via a seismic survey where sources and receivers are positioned in a geologic environment to emit and receive seismic energy where at least a portion of such energy can reflect off subsurface structures. As an example, a seismic data analysis framework or frameworks (e.g., consider the OMEGA® framework, marketed by Schlumberger Limited, Houston, Tex.) may be utilized to determine depth, extent, properties, etc. of subsurface structures. As an example, seismic data analysis can include forward modeling and/or inversion, for example, to iteratively build a model of a subsurface region of a geologic environment. As an example, a seismic data analysis framework may be part of or operatively coupled to a seismic-to-simulation framework (e.g., the PETREL® framework, etc.).

As an example, a workflow may be a process implementable at least in part in the OCEAN® framework. As an example, a workflow may include one or more worksteps that access a module such as a plug-in (e.g., external executable code, etc.).

As an example, a framework may provide for modeling petroleum systems. For example, the commercially available modeling framework marketed as the PETROMOD® framework (Schlumberger Limited, Houston, Tex.) includes features for input of various types of information (e.g., seismic, well, geological, etc.) to model evolution of a sedimentary basin. The PETROMOD® framework provides for petroleum systems modeling via input of various data such as seismic data, well data and other geological data, for example, to model evolution of a sedimentary basin. The PETROMOD® framework may predict if, and how, a reservoir has been charged with hydrocarbons, including, for example, the source and timing of hydrocarbon generation, migration routes, quantities, pore pressure and hydrocarbon type in the subsurface or at surface conditions. In combination with a framework such as the PETREL® framework, workflows may be constructed to provide basin-to-prospect scale exploration solutions. Data exchange between frameworks can facilitate construction of models, analysis of data (e.g., PETROMOD® framework data analyzed using PETREL® framework capabilities), and coupling of workflows.

As mentioned, a drillstring can include various tools that may make measurements. As an example, a wireline tool or another type of tool may be utilized to make measurements. As an example, a tool may be configured to acquire electrical borehole images. As an example, the fullbore Formation MicroImager (FMI) tool (Schlumberger Limited, Houston, Tex.) can acquire borehole image data. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material.

Analysis of formation information may reveal features such as, for example, vugs, dissolution planes (e.g., dissolution along bedding planes), stress-related features, dip events, etc. As an example, a tool may acquire information that may help to characterize a reservoir, optionally a fractured reservoir where fractures may be natural and/or artificial (e.g., hydraulic fractures). As an example, information acquired by a tool or tools may be analyzed using a framework such as the TECHLOG® framework. As an example, the TECHLOG® framework can be interoperable with one or more other frameworks such as, for example, the PETREL® framework.

Figure 4:
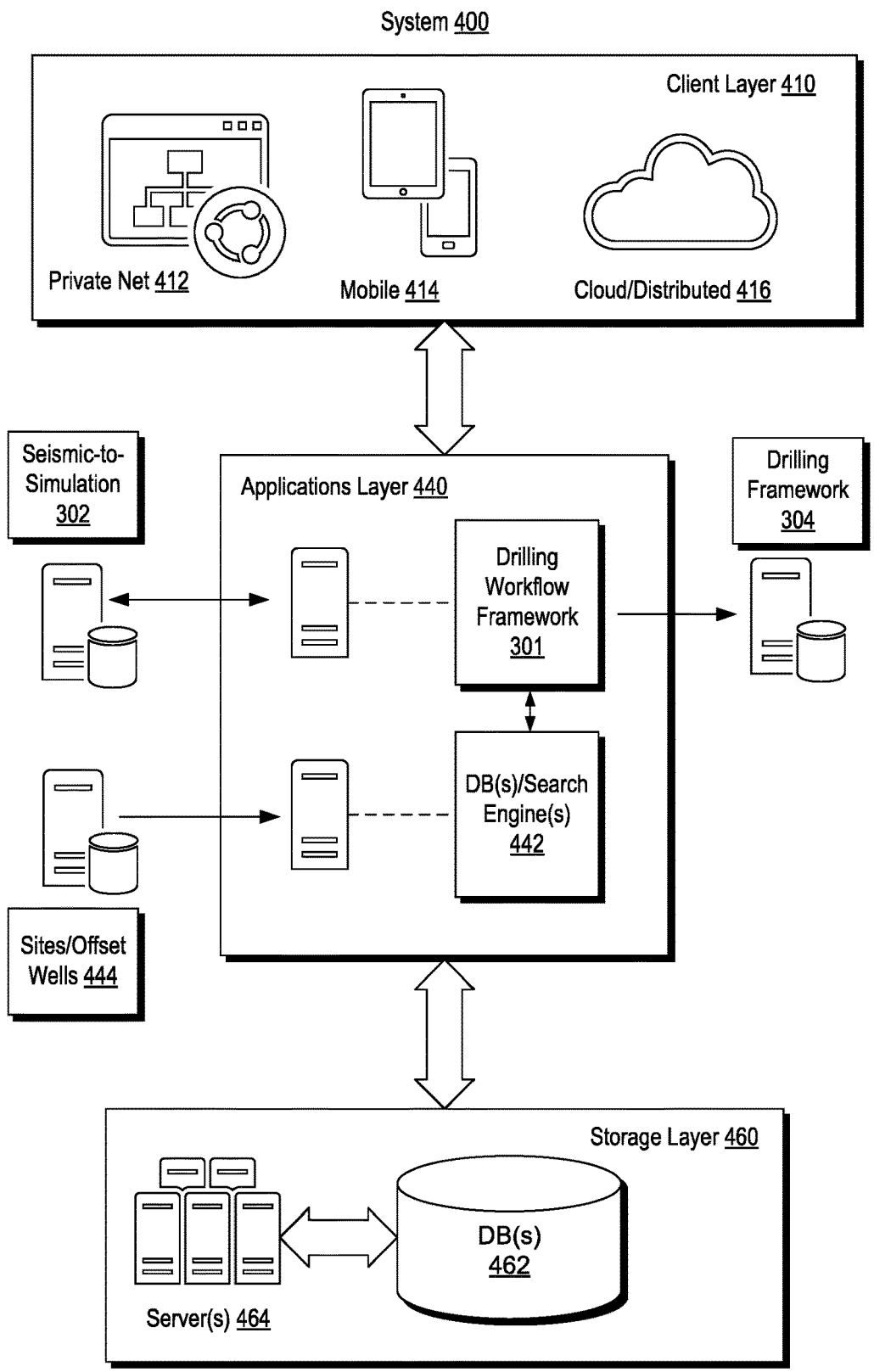
FIG. 4 illustrates an example of a system.

FIG. 4 shows an example of a system 400 that includes a client layer 410, an applications layer 440 and a storage layer 460. As shown the client layer 410 can be in communication with the applications layer 440 and the applications layer 440 can be in communication with the storage layer 460.

The client layer 410 can include features that allow for access and interactions via one or more private networks 412, one or more mobile platforms and/or mobile networks 414 and via the "cloud" 416, which may be considered to include distributed equipment that forms a network such as a network of networks.

In the example of FIG. 4, the applications layer 440 includes the drilling workflow framework 301 as mentioned with respect to the example of FIG. 3. The applications layer 440 also includes a database management component 442 that includes one or more search engines modules.

As an example, the database management component 442 can include one or more search engine modules that provide for searching one or more information that may be stored in one or more data repositories. As an example, the STUDIO E&P™ knowledge environment (Schlumberger Ltd., Houston, Tex.) includes STUDIO FIND™ search functionality, which provides a search engine. The STUDIO FIND™ search functionality also provides for indexing content, for example, to create one or more indexes. As an example, search functionality may provide for access to public content, private content or both, which may exist in one or more databases, for example, optionally distributed and accessible via an intranet, the Internet or one or more other networks. As an example, a search engine may be configured to apply one or more filters from a set or sets of filters, for example, to enable users to filter out data that may not be of interest.

As an example, a framework may provide for interaction with a search engine and, for example, associated features such as features of the STUDIO FIND™ search functionality. As an example, a framework may provide for implementation of one or more spatial filters (e.g., based on an area viewed on a display, static data, etc.). As an example, a search may provide access to dynamic data (e.g., "live" data from one or more sources), which may be available via one or more networks (e.g., wired, wireless, etc.). As an example, one or more modules may optionally be implemented within a framework or, for example, in a manner operatively coupled to a framework (e.g., as an add-on, a plug-in, etc.). As an example, a module for structuring search results (e.g., in a list, a hierarchical tree structure, etc.) may optionally be implemented within a framework or, for example, in a manner operatively coupled to a framework (e.g., as an add-on, a plug-in, etc.).

In the example of FIG. 4, the applications layer 440 can include communicating with one or more resources such as, for example, the seismic-to-simulation framework 302, the drilling framework 304 and/or one or more sites, which may be or include one or more offset wellsites. As an example, the applications layer 440 may be implemented for a particular wellsite where information can be processed as part of a workflow for operations such as, for example, operations performed, being performed and/or to be performed at the particular wellsite. As an example, an operation may involve directional drilling, for example, via geosteering.

In the example of FIG. 4, the storage layer 460 can include various types of data, information, etc., which may be stored in one or more databases 462. As an example, one or more servers 464 may provide for management, access, etc., to data, information, etc., stored in the one or more databases 462. As an example, the module 442 may provide for searching as to data, information, etc., stored in the one or more databases 462.

As an example, the module 442 may include features for indexing, etc. As an example, information may be indexed at least in part with respect to wellsite. For example, where the applications layer 440 is implemented to perform one or more workflows associated with a particular wellsite, data, information, etc., associated with that particular wellsite may be indexed based at least in part on the wellsite being an index parameter (e.g., a search parameter).

As an example, the system 400 of FIG. 4 may be implemented to perform one or more portions of one or more workflows associated with the system 300 of FIG. 3. For example, the drilling workflow framework 301 may interact with the technical data framework 303 and the drilling framework 304 before, during and/or after performance of one or more drilling operations. In such an example, the one or more drilling operations may be performed in a geologic environment (see, e.g., the environment 150 of FIG. 1) using one or more types of equipment (see, e.g., equipment of FIGS. 1 and 2).

Figure 5:
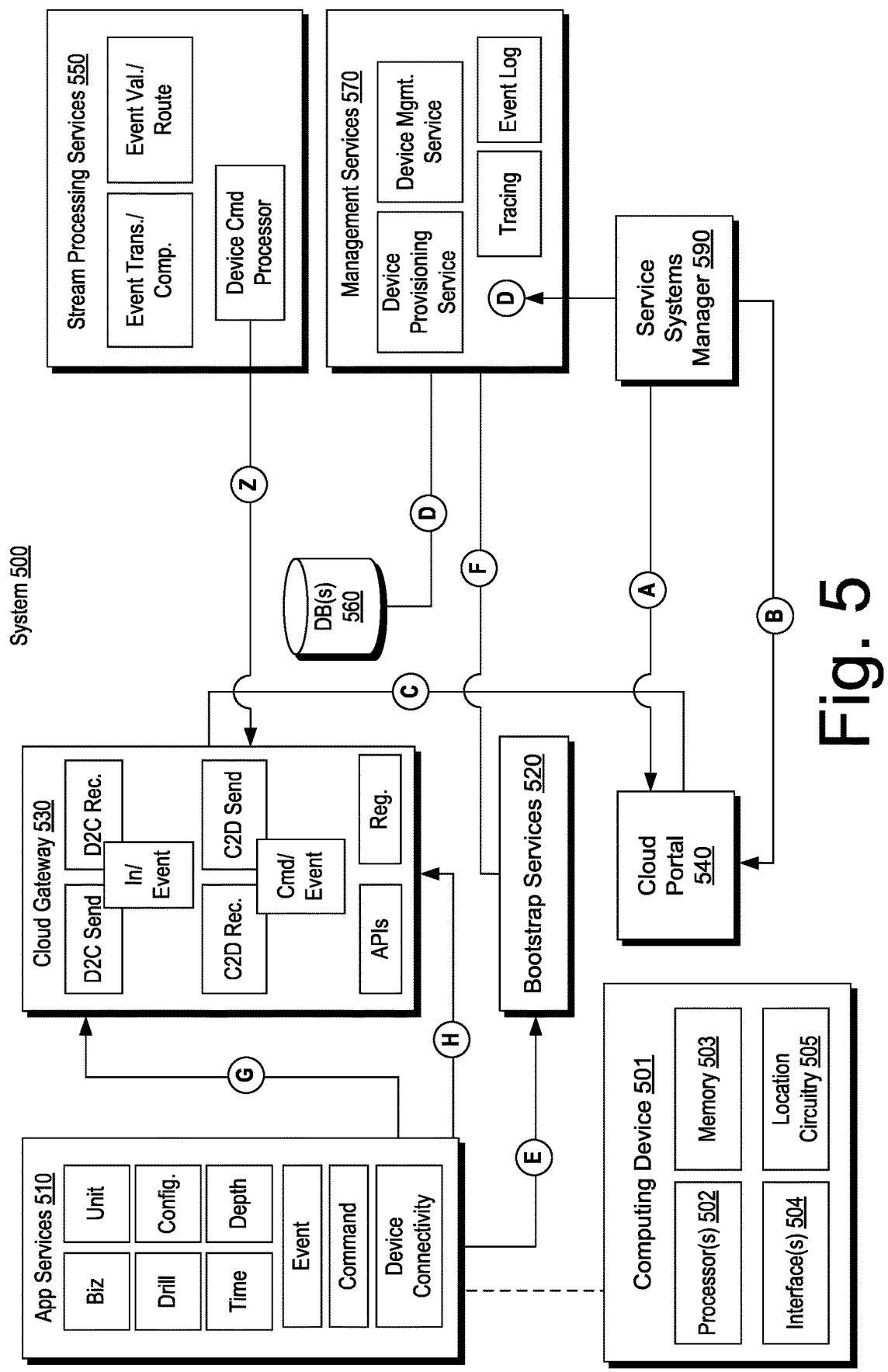
FIG. 5 illustrates an example of a system.

FIG. 5 shows an example of a system 500 that includes a computing device 501, an application services block 510, a bootstrap services block 520, a cloud gateway block 530, a cloud portal block 540, a stream processing services block 550, one or more databases 560, a management services block 570 and a service systems manager 590.

In the example of FIG. 5, the computing device 501 can include one or more processors 502, memory 503, one or more interfaces 504 and location circuitry 505 or, for example, one of the one or more interfaces 504 may be operatively coupled to location circuitry that can acquire local location information. For example, the computing device 501 can include GPS circuitry as location circuitry such that the approximate location of the computer device 501 can be determined. While GPS is mentioned (Global Positioning System), location circuitry may employ one or more types of locating techniques. For example, consider one or more of GLONASS, GALILEO, BeiDou-2, or another system (e.g., global navigation satellite system, "GNSS"). As an example, location circuitry may include cellular phone circuitry (e.g., LTE, 3G, 4G, etc.). As an example, location circuitry may include WiFi circuitry.

As an example, the application services block 510 can be implemented via instructions executable using the computing device 501. As an example, the computing device 501 may be at a wellsite and part of wellsite equipment. As an example, the computing device 501 may be a mobile computing device (e.g., tablet, laptop, etc.) or a desktop computing device that may be mobile, for example, as part of wellsite equipment (e.g., doghouse equipment, rig equipment, vehicle equipment, etc.).

As an example, the system 500 can include performing various actions. For example, the system 500 may include a token that is utilized as a security measure to assure that information (e.g., data) is associated with appropriate permission or permissions for transmission, storage, access, etc.

In the example of FIG. 5, various circles are shown with labels A to H. As an example, A can be a process where an administrator creates a shared access policy (e.g., manually, via an API, etc.); B can be a process for allocating a shared access key for a device identifier (e.g., a device ID), which may be performed manually, via an API, etc.); C can be a process for creating a "device" that can be registered in a device registry and for allocating a symmetric key; D can be a process for persisting metadata where such metadata may be associated with a wellsite identifier (e.g., a well ID) and where, for example, location information (e.g., GPS based information, etc.) may be associated with a device ID and a well ID; E can be a process where a bootstrap message passes that includes a device ID (e.g., a trusted platform module (TPM) chip ID that may be embedded within a device) and that includes a well ID and location information such that bootstrap services (e.g., of the bootstrap services block 520) can proceed to obtain shared access signature (SAS) key(s) to a cloud service endpoint for authorization; F can be a process for provisioning a device, for example, if not already provisioned, where, for example, the process can include returning device keys and endpoint; G can be a process for getting a SAS token using an identifier and a key; and H can be a process that includes being ready to send a message using device credentials. Also shown in FIG. 5 is a process for getting a token and issuing a command for a well identifier (see label Z).

As an example, Shared Access Signatures can be an authentication mechanism based on, for example, SHA-256 secure hashes, URIs, etc. As an example, SAS may be used by one or more Service Bus services. SAS can be implemented via a Shared Access Policy and a Shared Access Signature, which may be referred to as a token. As an example, for SAS applications using the AZURE™ .NET SDK with the Service Bus, .NET libraries can use SAS authorization through the SharedAccessSignatureTokenProvider class.

As an example, where a system gives an entity (e.g., a sender, a client, etc.) a SAS token, that entity does not have the key directly, and that entity cannot reverse the hash to obtain it. As such, there is control over what that entity can access and, for example, for how long access may exist. As an example, in SAS, for a change of the primary key in the policy, Shared Access Signatures created from it will be invalidated.

As an example, the system 500 of FIG. 5 can be implemented for provisioning of rig acquisition system and/or data delivery.

As an example, a method can include establishing an Internet of Things (IoT) hub or hubs. As an example, such a hub or hubs can include one or more device registries. In such an example, the hub or hubs may provide for storage of metadata associated with a device and, for example, a per-device authentication model. As an example, where location information indicates that a device (e.g., wellsite equipment, etc.) has been changed with respect to its location, a method can include revoking the device in a hub.

As an example, such an architecture utilized in a system such as, for example, the system 500, may include features of the AZURE™ architecture (Microsoft Corporation, Redmond, Wash.). As an example, the cloud portal block 540 can include one or more features of an AZURE™ portal that can manage, mediate, etc. access to one or more services, data, connections, networks, devices, etc.

As an example, the system 500 can include a cloud computing platform and infrastructure, for example, for building, deploying, and managing applications and services (e.g., through a network of datacenters, etc.). As an example, such a cloud platform may provide PaaS and IaaS services and support one or more different programming languages, tools and frameworks, etc.

Figure 6:
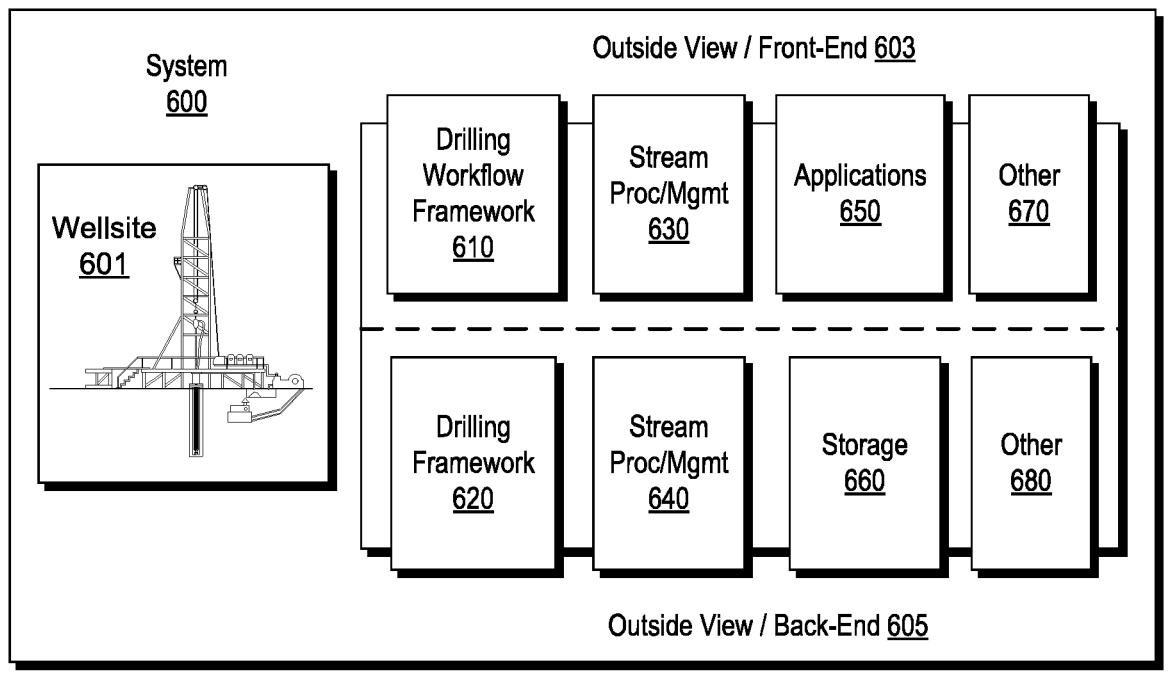
FIG. 6 illustrates an example of a system and an example of a scenario.
Figure 6:
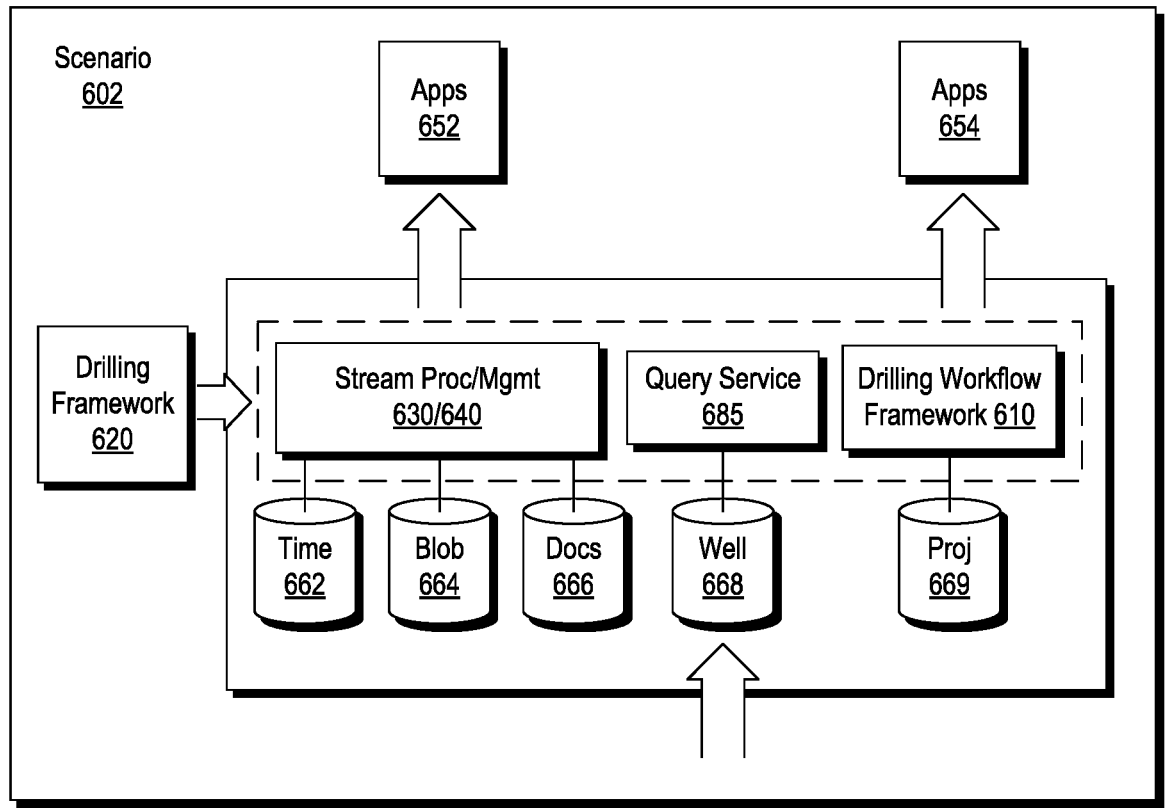

FIG. 6 shows an example of a system 600 associated with an example of a wellsite system 601 and also shows an example scenario 602. As shown in FIG. 6, the system 600 can include a front-end 603 and a back-end 605 from an outside or external perspective (e.g., external to the wellsite system 601, etc.). In the example of FIG. 6, the system 600 includes a drilling framework 620, a stream processing and/or management block 640, storage 660 and optionally one or more other features that can be defined as being back-end features. In the example of FIG. 6, the system 600 includes a drilling workflow framework 610, a stream processing and/or management block 630, applications 650 and optionally one or more other features that can be defined as being front-end features.

As an example, a user operating a user device can interact with the front-end 603 where the front-end 603 can interact with one or more features of the back-end 605. As an example, such interactions may be implemented via one or more networks, which may be associated with a cloud platform (e.g., cloud resources, etc.).

As to the example scenario 602, the drilling framework 620 can provide information associated with, for example, the wellsite system 601. As shown, the stream blocks 630 and 640, a query service 685 and the drilling workflow framework 610 may receive information and direct such information to storage, which may include a time series database 662, a blob storage database 664, a document database 666, a well information database 668, a project(s) database 669, etc. As an example, the well information database 668 may receive and store information such as, for example, customer information (e.g., from entities that may be owners of rights at a wellsite, service providers at a wellsite, etc.). As an example, the project database 669 can include information from a plurality of projects where a project may be, for example, a wellsite project.

As an example, the system 600 can be operable for a plurality of wellsites, which may include active and/or inactive wellsites and/or, for example, one or more planned wellsites. As an example, the system 600 can include various components of the system 300 of FIG. 3. As an example, the system 600 can include various components of the system 400 of FIG. 4. For example, the drilling workflow framework 610 can be a drilling workflow framework such as the drilling workflow framework 301 and/or, for example, the drilling framework 620 can be a drilling framework such as the drilling framework 304.

Figure 7:
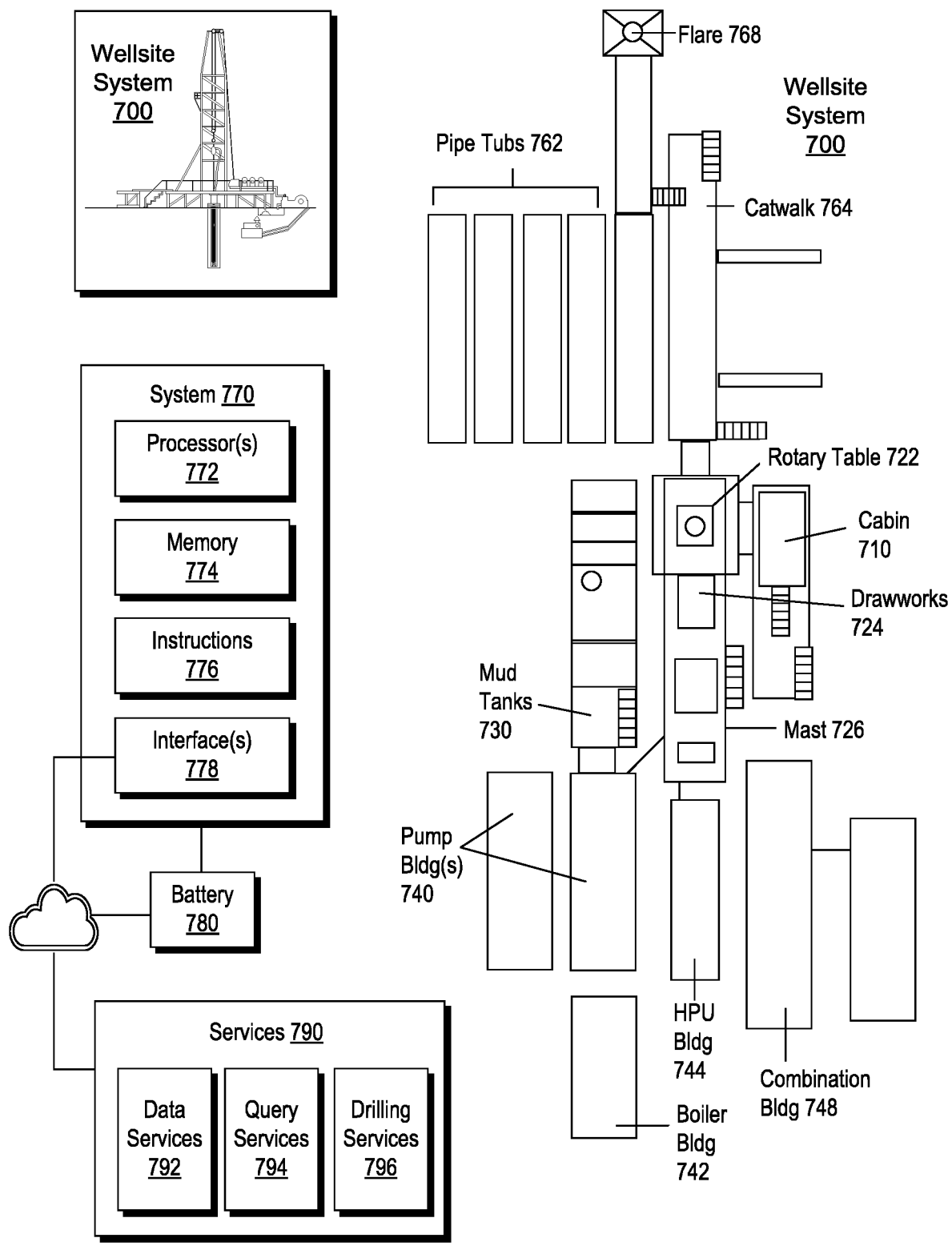
FIG. 7 illustrates an example of a wellsite system.

FIG. 7 shows an example of a wellsite system 700, specifically, FIG. 7 shows the wellsite system 700 in an approximate side view and an approximate plan view along with a block diagram of a system 770.

In the example of FIG. 7, the wellsite system 700 can include a cabin 710, a rotary table 722, drawworks 724, a mast 726 (e.g., optionally carrying a top drive, etc.), mud tanks 730 (e.g., with one or more pumps, one or more shakers, etc.), one or more pump buildings 740, a boiler building 742, an HPU building 744 (e.g., with a rig fuel tank, etc.), a combination building 748 (e.g., with one or more generators, etc.), pipe tubs 762, a catwalk 764, a flare 768, etc. Such equipment can include one or more associated functions and/or one or more associated operational risks, which may be risks as to time, resources, and/or humans.

As shown in the example of FIG. 7, the wellsite system 700 can include a system 770 that includes one or more processors 772, memory 774 operatively coupled to at least one of the one or more processors 772, instructions 776 that can be, for example, stored in the memory 774, and one or more interfaces 778. As an example, the system 770 can include one or more processor-readable media that include processor-executable instructions executable by at least one of the one or more processors 772 to cause the system 770 to control one or more aspects of the wellsite system 700. In such an example, the memory 774 can be or include the one or more processor-readable media where the processor-executable instructions can be or include instructions. As an example, a processor-readable medium can be a computer-readable storage medium that is not a signal and that is not a carrier wave.

FIG. 7 also shows a battery 780 that may be operatively coupled to the system 770, for example, to power the system 770. As an example, the battery 780 may be a back-up battery that operates when another power supply is unavailable for powering the system 770. As an example, the battery 780 may be operatively coupled to a network, which may be a cloud network. As an example, the battery 780 can include smart battery circuitry and may be operatively coupled to one or more pieces of equipment via a SMBus or other type of bus.

In the example of FIG. 7, services 790 are shown as being available, for example, via a cloud platform. Such services can include data services 792, query services 794 and drilling services 796. As an example, the services 790 may be part of a system such as the system 300 of FIG. 3, the system 400 of FIG. 4 and/or the system 600 of FIG. 6.

As an example, a system such as, for example, the system 300 of FIG. 3 may be utilized to perform a workflow. Such a system may be distributed and allow for collaborative workflow interactions and may be considered to be a platform (e.g., a framework for collaborative interactions, etc.).

As an example, one or more systems can be utilized to implement a workflow that can be performed collaboratively. As an example, the system 300 of FIG. 3 can be operated as a distributed, collaborative well-planning system. The system 300 can utilize one or more servers, one or more client devices, etc. and may maintain one or more databases, data files, etc., which may be accessed and modified by one or more client devices, for example, using a web browser, remote terminal, etc. As an example, a client device may modify a database or data files on-the-fly, and/or may include "sandboxes" that may permit one or more client devices to modify at least a portion of a database or data files optionally off-line, for example, without affecting a database or data files seen by one or more other client devices. As an example, a client device that includes a sandbox may modify a database or data file after completing an activity in the sandbox.

In some examples, client devices and/or servers may be remote with respect to one another and/or may individually include two or more remote processing units. As an example, two systems can be "remote" with respect to one another if they are not physically proximate to one another; for example, two devices that are located at different sides of a room, in different rooms, in different buildings, in different cities, countries, etc. may be considered "remote" depending on the context. In some embodiments, two or more client devices may be proximate to one another, and/or one or more client devices and a server may be proximate to one another.

As an example, various aspects of a workflow may be completed automatically, may be partially automated, or may be completed manually, as by a human user interfacing with a software application. As an example, a workflow may be cyclic, and may include, as an example, four stages such as, for example, an evaluation stage (see, e.g., the evaluation equipment 310), a planning stage (see, e.g., the planning equipment 320), an engineering stage (see, e.g., the engineering equipment 330) and an execution stage (see, e.g., the operations equipment 340). As an example, a workflow may commence at one or more stages, which may progress to one or more other stages (e.g., in a serial manner, in a parallel manner, in a cyclical manner, etc.).

As an example, a workflow can commence with an evaluation stage, which may include a geological service provider evaluating a formation (see, e.g., the evaluation block 314). As an example, a geological service provider may undertake the formation evaluation using a computing system executing a software package tailored to such activity; or, for example, one or more other suitable geology platforms may be employed (e.g., alternatively or additionally). As an example, the geological service provider may evaluate the formation, for example, using earth models, geophysical models, basin models, petrotechnical models, combinations thereof, and/or the like. Such models may take into consideration a variety of different inputs, including offset well data, seismic data, pilot well data, other geologic data, etc. The models and/or the input may be stored in the database maintained by the server and accessed by the geological service provider.

As an example, a workflow may progress to a geology and geophysics ("G&G") service provider, which may generate a well trajectory (see, e.g., the generation block 324), which may involve execution of one or more G&G software packages. Examples of such software packages include the PETREL® framework. As an example, a G&G service provider may determine a well trajectory or a section thereof, based on, for example, one or more model(s) provided by a formation evaluation (e.g., per the evaluation block 314), and/or other data, e.g., as accessed from one or more databases (e.g., maintained by one or more servers, etc.). As an example, a well trajectory may take into consideration various "basis of design" (BOD) constraints, such as general surface location, target (e.g., reservoir) location, and the like. As an example, a trajectory may incorporate information about tools, bottom-hole assemblies, casing sizes, etc., that may be used in drilling the well. A well trajectory determination may take into consideration a variety of other parameters, including risk tolerances, fluid weights and/or plans, bottom-hole pressures, drilling time, etc.

As an example, a workflow may progress to a first engineering service provider (e.g., one or more processing machines associated therewith), which may validate a well trajectory and, for example, relief well design (see, e.g., the validation block 328). Such a validation process may include evaluating physical properties, calculations, risk tolerances, integration with other aspects of a workflow, etc. As an example, one or more parameters for such determinations may be maintained by a server and/or by the first engineering service provider; noting that one or more model(s), well trajectory(ies), etc. may be maintained by a server and accessed by the first engineering service provider. For example, the first engineering service provider may include one or more computing systems executing one or more software packages. As an example, where the first engineering service provider rejects or otherwise suggests an adjustment to a well trajectory, the well trajectory may be adjusted or a message or other notification sent to the G&G service provider requesting such modification.

As an example, one or more engineering service providers (e.g., first, second, etc.) may provide a casing design, bottom-hole assembly (BHA) design, fluid design, and/or the like, to implement a well trajectory (see, e.g., the design block 338). In some embodiments, a second engineering service provider may perform such design using one of more software applications. Such designs may be stored in one or more databases maintained by one or more servers, which may, for example, employ STUDIO® framework tools, and may be accessed by one or more of the other service providers in a workflow.

As an example, a second engineering service provider may seek approval from a third engineering service provider for one or more designs established along with a well trajectory. In such an example, the third engineering service provider may consider various factors as to whether the well engineering plan is acceptable, such as economic variables (e.g., oil production forecasts, costs per barrel, risk, drill time, etc.), and may request authorization for expenditure, such as from the operating company's representative, well-owner's representative, or the like (see, e.g., the formulation block 334). As an example, at least some of the data upon which such determinations are based may be stored in one or more database maintained by one or more servers. As an example, a first, a second, and/or a third engineering service provider may be provided by a single team of engineers or even a single engineer, and thus may or may not be separate entities.

As an example, where economics may be unacceptable or subject to authorization being withheld, an engineering service provider may suggest changes to casing, a bottom-hole assembly, and/or fluid design, or otherwise notify and/or return control to a different engineering service provider, so that adjustments may be made to casing, a bottom-hole assembly, and/or fluid design. Where modifying one or more of such designs is impracticable within well constraints, trajectory, etc., the engineering service provider may suggest an adjustment to the well trajectory and/or a workflow may return to or otherwise notify an initial engineering service provider and/or a G&G service provider such that either or both may modify the well trajectory.

As an example, a workflow can include considering a well trajectory, including an accepted well engineering plan, and a formation evaluation. Such a workflow may then pass control to a drilling service provider, which may implement the well engineering plan, establishing safe and efficient drilling, maintaining well integrity, and reporting progress as well as operating parameters (see, e.g., the blocks 344 and 348). As an example, operating parameters, formation encountered, data collected while drilling (e.g., using logging-while-drilling or measuring-while-drilling technology), may be returned to a geological service provider for evaluation. As an example, the geological service provider may then re-evaluate the well trajectory, or one or more other aspects of the well engineering plan, and may, in some cases, and potentially within predetermined constraints, adjust the well engineering plan according to the real-life drilling parameters (e.g., based on acquired data in the field, etc.).

Whether the well is entirely drilled, or a section thereof is completed, depending on the specific embodiment, a workflow may proceed to a post review (see, e.g., the evaluation block 318). As an example, a post review may include reviewing drilling performance. As an example, a post review may further include reporting the drilling performance (e.g., to one or more relevant engineering, geological, or G&G service providers).

Various activities of a workflow may be performed consecutively and/or may be performed out of order (e.g., based partially on information from templates, nearby wells, etc. to fill in any gaps in information that is to be provided by another service provider). As an example, undertaking one activity may affect the results or basis for another activity, and thus may, either manually or automatically, call for a variation in one or more workflow activities, work products, etc. As an example, a server may allow for storing information on a central database accessible to various service providers where variations may be sought by communication with an appropriate service provider, may be made automatically, or may otherwise appear as suggestions to the relevant service provider. Such an approach may be considered to be a holistic approach to a well workflow, in comparison to a sequential, piecemeal approach.

As an example, various actions of a workflow may be repeated multiple times during drilling of a wellbore. For example, in one or more automated systems, feedback from a drilling service provider may be provided at or near real-time, and the data acquired during drilling may be fed to one or more other service providers, which may adjust its piece of the workflow accordingly. As there may be dependencies in other areas of the workflow, such adjustments may permeate through the workflow, e.g., in an automated fashion. In some embodiments, a cyclic process may additionally or instead proceed after a certain drilling goal is reached, such as the completion of a section of the wellbore, and/or after the drilling of the entire wellbore, or on a per-day, week, month, etc. basis.

Well planning can include determining a path of a well that can extend to a reservoir, for example, to economically produce fluids such as hydrocarbons therefrom. Well planning can include selecting a drilling and/or completion assembly which may be used to implement a well plan. As an example, various constraints can be imposed as part of well planning that can impact design of a well. As an example, such constraints may be imposed based at least in part on information as to known geology of a subterranean domain, presence of one or more other wells (e.g., actual and/or planned, etc.) in an area (e.g., consider collision avoidance), etc. As an example, one or more constraints may be imposed based at least in part on characteristics of one or more tools, components, etc. As an example, one or more constraints may be based at least in part on factors associated with drilling time and/or risk tolerance.

As an example, a system can allow for a reduction in waste, for example, as may be defined according to LEAN. In the context of LEAN, consider one or more of the following types of waste: Transport (e.g., moving items unnecessarily, whether physical or data); Inventory (e.g., components, whether physical or informational, as work in process, and finished product not being processed); Motion (e.g., people or equipment moving or walking unnecessarily to perform desired processing); Waiting (e.g., waiting for information, interruptions of production during shift change, etc.); Overproduction (e.g., production of material, information, equipment, etc. ahead of demand); Over Processing (e.g., resulting from poor tool or product design creating activity); and Defects (e.g., effort involved in inspecting for and fixing defects whether in a plan, data, equipment, etc.). As an example, a system that allows for actions (e.g., methods, workflows, etc.) to be performed in a collaborative manner can help to reduce one or more types of waste.

As an example, a system can be utilized to implement a method for facilitating distributed well engineering, planning, and/or drilling system design across multiple computation devices where collaboration can occur among various different users (e.g., some being local, some being remote, some being mobile, etc.). In such a system, the various users via appropriate devices may be operatively coupled via one or more networks (e.g., local and/or wide area networks, public and/or private networks, land-based, marine-based and/or areal networks, etc.).

As an example, a system may allow well engineering, planning, and/or drilling system design to take place via a subsystems approach where a wellsite system is composed of various subsystem, which can include equipment subsystems and/or operational subsystems (e.g., control subsystems, etc.). As an example, computations may be performed using various computational platforms/devices that are operatively coupled via communication links (e.g., network links, etc.). As an example, one or more links may be operatively coupled to a common database (e.g., a server site, etc.). As an example, a particular server or servers may manage receipt of notifications from one or more devices and/or issuance of notifications to one or more devices. As an example, a system may be implemented for a project where the system can output a well plan, for example, as a digital well plan, a paper well plan, a digital and paper well plan, etc. Such a well plan can be a complete well engineering plan or design for the particular project.

Figure 8:
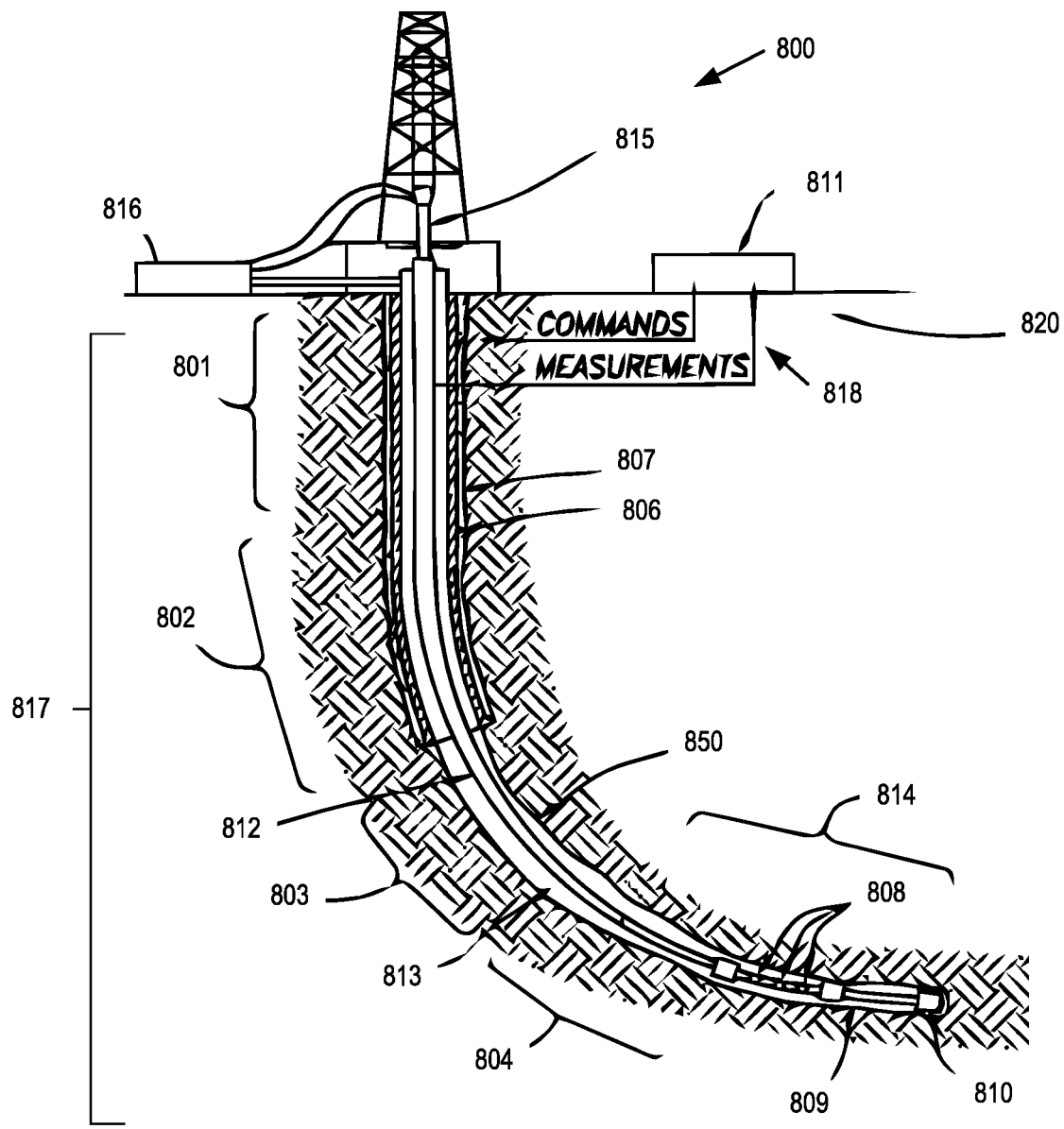
FIG. 8 illustrates an example of a system.

FIG. 8 shows a schematic diagram depicting an example of a drilling operation of a directional well in multiple sections. The drilling operation depicted in FIG. 8 includes a wellsite drilling system 800 and a field management tool 820 for managing various operations associated with drilling a bore hole 850 of a directional well 817. The wellsite drilling system 800 includes various components (e.g., drillstring 812, annulus 813, bottom hole assembly (BHA) 814, kelly 815, mud pit 816, etc.). As shown in the example of FIG. 8, a target reservoir may be located away from (as opposed to directly under) the surface location of the well 817. In such an example, special tools or techniques may be used to ensure that the path along the bore hole 850 reaches the particular location of the target reservoir.

As an example, the BHA 814 may include sensors 808, a rotary steerable system 809, and a bit 810 to direct the drilling toward the target guided by a pre-determined survey program for measuring location details in the well. Furthermore, the subterranean formation through which the directional well 817 is drilled may include multiple layers (not shown) with varying compositions, geophysical characteristics, and geological conditions. Both the drilling planning during the well design stage and the actual drilling according to the drilling plan in the drilling stage may be performed in multiple sections (e.g., sections 801, 802, 803 and 804) corresponding to the multiple layers in the subterranean formation. For example, certain sections (e.g., sections 801 and 802) may use cement 807 reinforced casing 806 due to the particular formation compositions, geophysical characteristics, and geological conditions.

In the example of FIG. 8, a surface unit 811 may be operatively linked to the wellsite drilling system 800 and the field management tool 820 via communication links 818. The surface unit 811 may be configured with functionalities to control and monitor the drilling activities by sections in real-time via the communication links 818. The field management tool 820 may be configured with functionalities to store oilfield data (e.g., historical data, actual data, surface data, subsurface data, equipment data, geological data, geophysical data, target data, anti-target data, etc.) and determine relevant factors for configuring a drilling model and generating a drilling plan. The oilfield data, the drilling model, and the drilling plan may be transmitted via the communication link 818 according to a drilling operation workflow. The communication links 818 may include a communication subassembly.

During various operations at a wellsite, data can be acquired for analysis and/or monitoring of one or more operations. Such data may include, for example, subterranean formation, equipment, historical and/or other data. Static data can relate to, for example, formation structure and geological stratigraphy that define the geological structures of the subterranean formation. Static data may also include data about a bore, such as inside diameters, outside diameters, and depths. Dynamic data can relate to, for example, fluids flowing through the geologic structures of the subterranean formation over time. The dynamic data may include, for example, pressures, fluid compositions (e.g. gas oil ratio, water cut, and/or other fluid compositional information), and states of various equipment, and other information.

The static and dynamic data collected via a bore, a formation, equipment, etc. may be used to create and/or update a three dimensional model of one or more subsurface formations. As an example, static and dynamic data from one or more other bores, fields, etc. may be used to create and/or update a three dimensional model. As an example, hardware sensors, core sampling, and well logging techniques may be used to collect data. As an example, static measurements may be gathered using downhole measurements, such as core sampling and well logging techniques. Well logging involves deployment of a downhole tool into the wellbore to collect various downhole measurements, such as density, resistivity, etc., at various depths. Such well logging may be performed using, for example, a drilling tool and/or a wireline tool, or sensors located on downhole production equipment. Once a well is formed and completed, depending on the purpose of the well (e.g., injection and/or production), fluid may flow to the surface (e.g., and/or from the surface) using tubing and other completion equipment. As fluid passes, various dynamic measurements, such as fluid flow rates, pressure, and composition may be monitored. These parameters may be used to determine various characteristics of a subterranean formation, downhole equipment, downhole operations, etc.

To facilitate the processing and analysis of data, simulators may be used to process data. Data fed into the simulator (s) may be historical data, real time data or combinations thereof. Simulation through one or more of the simulators may be repeated or adjusted based on the data received. As an example, oilfield operations can be provided with wellsite and non-wellsite simulators. The wellsite simulators may include a reservoir simulator, a wellbore simulator, and a surface network simulator. The reservoir simulator may solve for hydrocarbon flowrate through the reservoir and into the wellbores. The wellbore simulator and surface network simulator may solve for hydrocarbon flowrate through the wellbore and the surface gathering network of pipelines.

Figure 9:
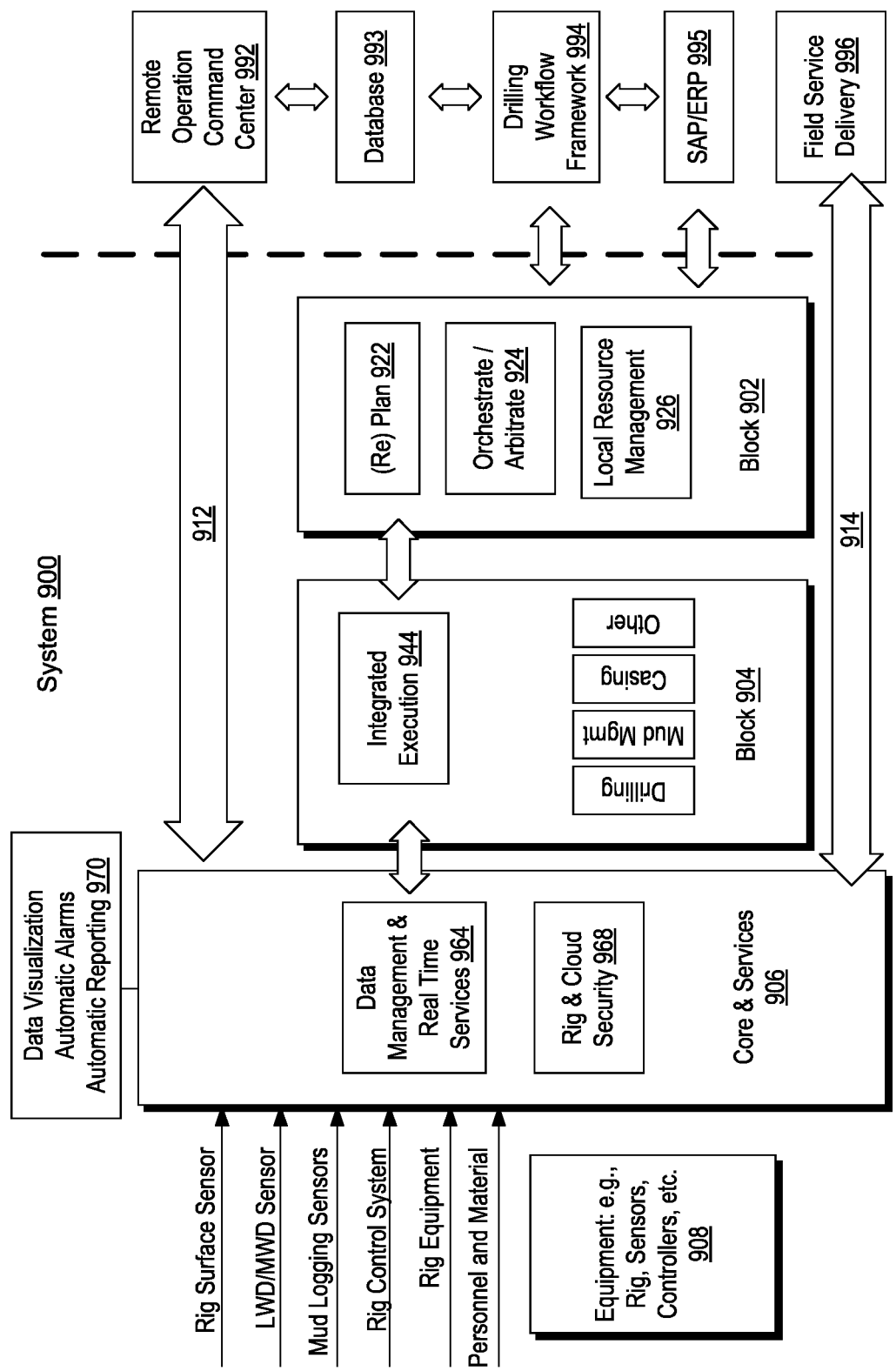
FIG. 9 illustrates an example of a system.

FIG. 9 shows an example of a system 900 that includes various components that can be local to a wellsite and includes various components that can be remote from a wellsite. As shown, the system 900 includes a block 902, a block 904, a Core & Services block 906 and an Equipment block 908. These blocks can be labeled in one or more manners other than as shown in the example of FIG. 9. In the example of FIG. 9, the blocks 902, 904, 906 and 908 can be defined by one or more of operational features, functions, relationships in an architecture, etc.

As an example, the blocks 902, 904, 906 and 908 may be described in a pyramidal architecture where, from peak to base, a pyramid includes the block 902, the block 904, the Core & Services block 906 and the Equipment block 908.

As an example, the block 902 can be associated with a well management level (e.g., well planning and/or orchestration) and can be associated with a rig management level (e.g., rig dynamic planning and/or orchestration). As an example, the block 904 can be associated with a process management level (e.g., rig integrated execution). As an example, the Core & Services block 906 can be associated with a data management level (e.g., sensor, instrumentation, inventory, etc.). As an example, the Equipment block 908 can be associated with a wellsite equipment level (e.g., wellsite subsystems, etc.).

As an example, the block 902 may receiving information from a drilling workflow framework and/or one or more other sources, which may be remote from a wellsite.

In the example of FIG. 9, the block 902 includes a plan/replan block 922, an orchestrate/arbitrate block 924 and a local resource management block 926. In the example of FIG. 9, the block 904 includes an integrated execution block 944, which can include or be operatively coupled to blocks for various subsystems of a wellsite such as a drilling subsystem, a mud management subsystem (e.g., a hydraulics subsystem), a casing subsystem (e.g., casings and/or completions subsystem), and, for example, one or more other subsystems. In the example of FIG. 9, the Core & Services block 906 includes a data management and real-time services block 964 (e.g., real-time or near real-time services) and a rig and cloud security block 968 (see, e.g., the system 500 of FIG. 5 as to provisioning and various type of security measures, etc.). In the example of FIG. 9, the Equipment block 908 is shown as being capable of providing various types of information to the Core & Services block 906. For example, consider information from a rig surface sensor, a LWD/MWD sensor, a mud logging sensor, a rig control system, rig equipment, personnel, material, etc. In the example, of FIG. 9, a block 970 can provide for one or more of data visualization, automatic alarms, automatic reporting, etc. As an example, the block 970 may be operatively coupled to the Core & Services block 906 and/or one or more other blocks.

As mentioned, a portion of the system 900 can be remote from a wellsite. For example, to one side of a dashed line appear a remote operation command center block 992, a database block 993, a drilling workflow framework block 994, a SAP/ERP block 995 and a field services delivery block 996. Various blocks that may be remote can be operatively coupled to one or more blocks that may be local to a wellsite system. For example, a communication link 912 is illustrated in the example of FIG. 9 that can operatively couple the blocks 906 and 992 (e.g., as to monitoring, remote control, etc.), while another communication link 914 is illustrated in the example of FIG. 9 that can operatively couple the blocks 906 and 996 (e.g., as to equipment delivery, equipment services, etc.). Various other examples of possible communication links are also illustrated in the example of FIG. 9.

As an example, the system 900 of FIG. 9 may be a field management tool. As an example, the system 900 of FIG. 9 may include a drilling framework (see, e.g., the drilling frameworks 304 and 620). As an example, blocks in the system 900 of FIG. 9 that may be remote from a wellsite may include various features of the services 790 of FIG. 7.

As an example, a wellbore can be drilled according to a drilling plan that is established prior to drilling. Such a drilling plan, which may be a well plan, can set forth equipment, pressures, trajectories and/or other parameters that define drilling process for a wellsite. As an example, a drilling operation may then be performed according to the drilling plan (e.g., well plan). As an example, as information is gathered, a drilling operation may deviate from a drilling plan. Additionally, as drilling or other operations are performed, subsurface conditions may change. Specifically, as new information is collected, sensors may transmit data to one or more surface units. As an example, a surface unit may automatically use such data to update a drilling plan (e.g., locally and/or remotely).

As an example, the drilling workflow framework 994 can be or include a G&G system and a well planning system. As an example, a G&G system corresponds to hardware, software, firmware, or a combination thereof that provides support for geology and geophysics. In other words, a geologist who understands the reservoir may decide where to drill the well using the G&G system that creates a three-dimensional model of the subsurface formation and includes simulation tools. The G&G system may transfer a well trajectory and other information selected by the geologist to a well planning system. The well planning system corresponds to hardware, software, firmware, or a combination thereof that produces a well plan. In other words, the well plan may be a high-level drilling program for the well. The well planning system may also be referred to as a well plan generator.

In the example of FIG. 9, various blocks can be components that may correspond to one or more software modules, hardware infrastructure, firmware, equipment, or any combination thereof. Communication between the components may be local or remote, direct or indirect, via application programming interfaces, and procedure calls, or through one or more communication channels.

As an example, various blocks in the system 900 of FIG. 9 can correspond to levels of granularity in controlling operations of associated with equipment and/or personnel in an oilfield. As shown in FIG. 9, the system 900 can include the block 902 (e.g., for well plan execution), the block 904 (e.g., process manager collection), the Core & Services block 906, and the Equipment block 908.

The block 902 may be referred to as a well plan execution system. For example, a well plan execution system corresponds to hardware, software, firmware or a combination thereof that performs an overall coordination of the well construction process, such as coordination of a drilling rig and the management of the rig and the rig equipment. A well plan execution system may be configured to obtain the general well plan from well planning system and transform the general well plan into a detailed well plan. The detailed well plan may include a specification of the activities involved in performing an action in the general well plan, the days and/or times to perform the activities, the individual resources performing the activities, and other information.

As an example, a well plan execution system may further include functionality to monitor an execution of a well plan to track progress and dynamically adjust the plan. Further, a well plan execution system may be configured to handle logistics and resources with respect to on and off the rig. As an example, a well plan execution system may include multiple sub-components, such as a detailer that is configured to detail the well planning system plan, a monitor that is configured to monitor the execution of the plan, a plan manager that is configured to perform dynamic plan management, and a logistics and resources manager to control the logistics and resources of the well. In one or more embodiments, a well plan execution system may be configured to coordinate between the different processes managed by a process manager collection (see, e.g., the block 904). In other words, a well plan execution system can communicate and manage resource sharing between processes in a process manager collection while operating at, for example, a higher level of granularity than process manager collection.

As to the block 904, as mentioned, it may be referred to as a process manager collection. In one or more embodiments, a process manager collection can include functionality to perform individual process management of individual domains of an oilfield, such as a rig. For example, when drilling a well, different activities may be performed. Each activity may be controlled by an individual process manager in the process manager collection. A process manager collection may include multiple process managers, whereby each process manager controls a different activity (e.g., activity related to the rig). In other words, each process manager may have a set of tasks defined for the process manager that is particular to the type of physics involved in the activity. For example, drilling a well may use drilling mud, which is fluid pumped into well in order to extract drill cuttings from the well. A drilling mud process manager may exist in a process manager collection that manages the mixing of the drilling mud, the composition, testing of the drilling mud properties, determining whether the pressure is accurate, and performing other such tasks. The drilling mud process manager may be separate from a process manager that controls movement of drill pipe from a well. Thus, a process manager collection may partition activities into several different domains and manages each of the domains individually. Amongst other possible process managers, a process manager collection may include, for example, a drilling process manager, a mud preparation and management process manager, a casing running process manager, a cementing process manager, a rig equipment process manager, and other process managers. Further, a process manager collection may provide direct control or advice regarding the components above. As an example, coordination between process managers in a process manager collection may be performed by a well plan execution system.

As to the Core & Service block 906 (e.g., a core services block or CS block), it can include functionality to manage individual pieces of equipment and/or equipment subsystems. As an example, a CS block can include functionality to handle basic data structure of the oilfield, such as the rig, acquire metric data, produce reports, and manages resources of people and supplies. As an example, a CS block may include a data acquirer and aggregator, a rig state identifier, a real-time (RT) drill services (e.g., near real-time), a reporter, a cloud, and an inventory manager.

As an example, a data acquirer and aggregator can include functionality to interface with individual equipment components and sensor and acquire data. As an example, a data acquirer and aggregator may further include functionality to interface with sensors located at the oilfield.

As an example, a rig state identifier can includes functionality to obtain data from the data acquirer and aggregator and transform the data into state information. As an example, state information may include health and operability of a rig as well as information about a particular task being performed by equipment.

As an example, RT drill services can include functionality to transmit and present information to individuals. In particular, the RT drill services can include functionality to transmit information to individuals involved according to roles and, for example, device types of each individual (e.g., mobile, desktop, etc.). In one or more embodiments, information presented by RT drill services can be context specific, and may include a dynamic display of information so that a human user may view details about items of interest.

As an example, in one or more embodiments, a reporter can include functionality to generate reports. For example, reporting may be based on requests and/or automatic generation and may provide information about state of equipment and/or people.

As an example, a wellsite "cloud" framework can correspond to an information technology infrastructure locally at an oilfield, such as an individual rig in the oilfield. In such an example, the wellsite "cloud" framework may be an "Internet of Things" (IoT) framework. As an example, a wellsite "cloud" framework can be an edge of the cloud (e.g., a network of networks) or of a private network.

As an example, an inventory manager can be a block that includes functionality to manage materials, such as a list and amount of each resource on a rig.

In the example of FIG. 9, the Equipment block 908 can correspond to various controllers, control unit, control equipment, etc. that may be operatively coupled to and/or embedded into physical equipment at a wellsite such as, for example, rig equipment. For example, the Equipment block 908 may correspond to software and control systems for individual items on the rig. As an example, the Equipment block 908 may provide for monitoring sensors from multiple subsystems of a drilling rig and provide control commands to multiple subsystem of the drilling rig, such that sensor data from multiple subsystems may be used to provide control commands to the different subsystems of the drilling rig and/or other devices, etc. For example, a system may collect temporally and depth aligned surface data and downhole data from a drilling rig and transmit the collected data to data acquirers and aggregators in core services, which can store the collected data for access onsite at a drilling rig or offsite via a computing resource environment.

In one or more embodiments, a method can include performing dynamic scheduling of a plan, which can include rescheduling of a plan. In such an example, a plan may be revised at least in part. As an example, a plan can be a well plan or, for example, a portion of a well plan. As an example, various components at various levels of granularity may be configured to continually monitor performance of tasks at a corresponding level of granularity of a component and, for example, update the plan based on state information about the performance of tasks.

As used in the following discussion, components in different levels of granularity may each have an individual plan that is based on the level of granularity. For example, a well plan execution system plan can be an overall plan for a well or entire oilfield while a process manager collection process manages performance of domain plans that can be specific to a respective process of a manager's domain. As an example, a well plan execution system may monitor and schedule tasks at a level that differs from that of an individual process manager level. For example, a well plan execution system may controls the execution of activities by process managers. As an example, a well plan execution system may enable interrelationships between process managers such that, for example, control information due to a delay of one process manager is transmitted to another process manager.

As an example, a plan can be a set of events or activities to be carried out to change the state of a well or a component thereof from a first state to a second state (e.g., a desired state) for the well or component thereof. In such an example, a plan may define, for one or more events: a list of any tasks in the plan that are to precede the task, an action to which the task relates, and a condition for the task. The condition may be, for example, an authorizing precondition detailing criterion that should happen before the task may be performed, a confirming condition defining when performance of the task is complete, and a failure condition defining when the performance of the task may be in error. For example, the failure condition may be the value of states of oilfield equipment that is indicative of a failure to comply with the plan and a call for rescheduling.

Performing tasks according to the plan may include, based upon a determination that one or more defined predecessor tasks for one or more tasks have been completed, and further starting at least one task of the plan, independently of time, based upon a determination that a pre-authorizing condition has been met. Performance of a task may be continually monitored to check for a failure condition being satisfied, and to check whether any confirming condition is satisfied. In some embodiments, the plan is scheduled according to time. In other embodiments, management of the plan is time independent.

As an example, one or more obstacles may occur in implementation of a plan. Thus, for example, in one or more embodiments, a method may continuously reassess state(s) of a system; regenerate a plan that regenerates a sequence of tasks in a second way (e.g., an optimal way). In one or more embodiments, regeneration can be performed continually taking into account a current state of an oilfield and a second state of the oilfield (e.g., desired state of the oilfield). In some embodiments, regeneration of a plan is performed when a failure condition is determined to exist.

In some embodiments, each portion of a system can be continuously and/or continually reassessed as to its state and a method can include generating a plan based on current state(s) to achieve a desired state for one or more portions of the system. In other words, the process managers of process manager collection, when executing a plan, may continually obtain state information from equipment (e.g., one or more subsystems through the core services) to identify one or more relevant states of the system. If the state information indicates a delay or failure condition, then the corresponding process managers of process manager collection may re-plan to achieve the desired state. For example, the process manager may automatically regenerate the sequence of tasks within the domain or level of granularity of the process manager.

If the re-planning is not possible in a process manager's domain, then re-planning may be elevated to a next level of granularity. For example, the re-planning from a particular process manager's domain may be elevated to the well plan execution system domain (e.g., passed from one level to another level).

As an example, a well planning system may have engineering expertise to make design choices for an overall plan. In such a scenario, a well plan execution system may regenerate a plan optionally without involving the well planning system, for example, as long as the new plan does not substantially alter engineering of the well. In particular, a well plan execution system might track resources that are being used by each of a plurality of process managers, but might not, for example, track one or more individual tasks of each of the plurality of process managers. Thus, when a process manager is re-planning, a well plan execution system might track which resources are available before, during, and/or after re-planning without having data regarding the details of the plan. In some embodiments the same re-planning may be used for multiple process managers and, in in some cases, a well plan execution system. In other embodiments, at least some components of the system may use a different re-planning engine.

In one or more embodiments, dependency information is maintained at various levels of granularity and managed at the various levels of granularity. Thus, if a component performs planning (e.g., re-planning, etc.) that cause a delay in a dependent task, the component may institute a change in the dependent task. If the change is with respect to a different domain, then the component may notify the process manager directly, or notify well plan execution system of the change.

Processing Systems

Figure 10:
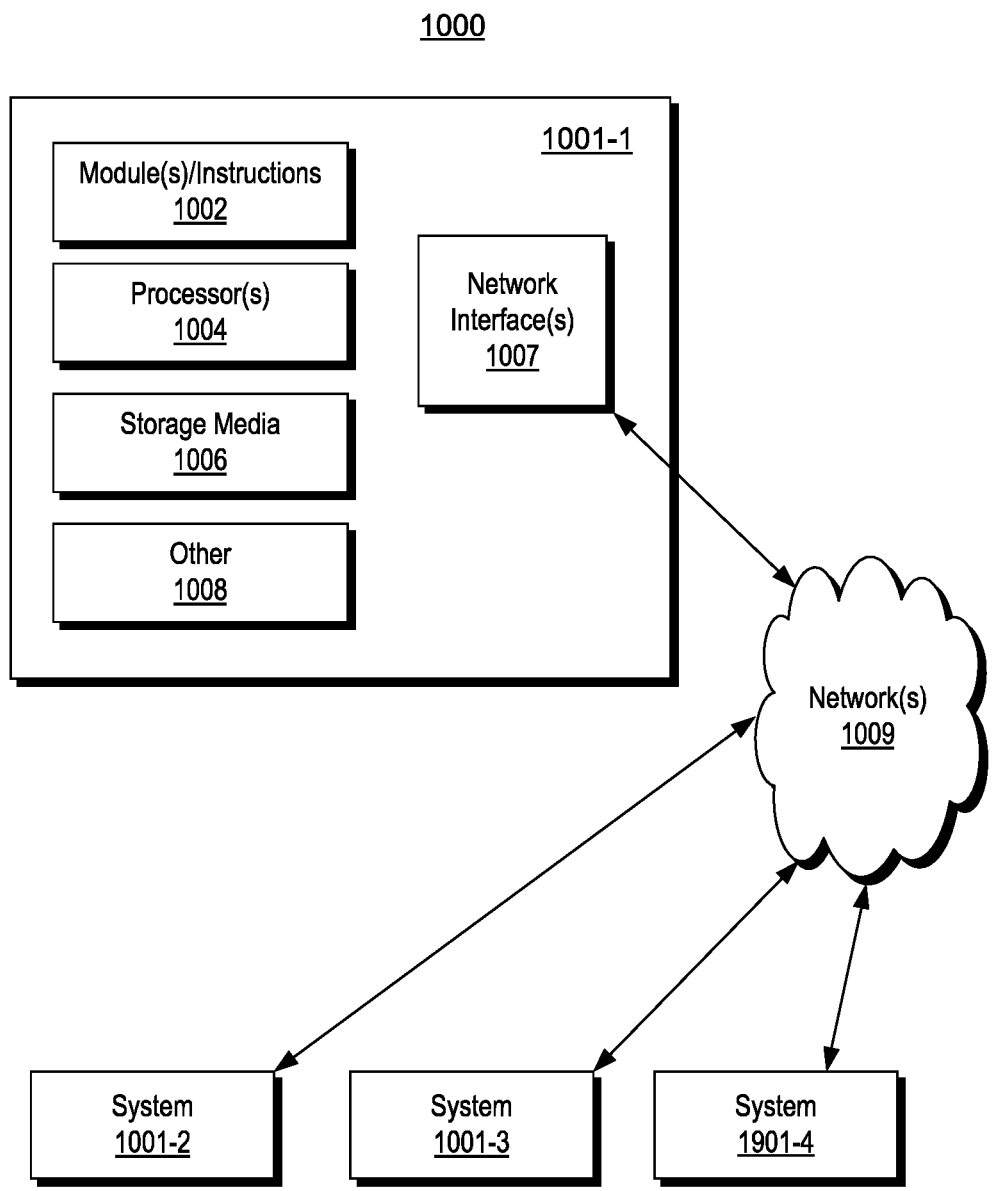
FIG. 10 illustrates examples of computing and networking equipment.

In some embodiments, a method or methods may be executed by a computing system. FIG. 10 shows an example of a system 1000 that can include one or more computing systems 1001-1, 1001-2, 1001-3 and 1001-4, which may be operatively coupled via one or more networks 1009, which may include wired and/or wireless networks.

As an example, a system can include an individual computer system or an arrangement of distributed computer systems. In the example of FIG. 10, the computer system 1001-1 can include one or more modules 1002, which may be or include processor-executable instructions, for example, executable to perform various tasks (e.g., receiving information, requesting information, processing information, simulation, outputting information, etc.).

As an example, a module may be executed independently, or in coordination with, one or more processors 1004, which is (or are) operatively coupled to one or more storage media 1006 (e.g., via wire, wirelessly, etc.). As an example, one or more of the one or more processors 1004 can be operatively coupled to at least one of one or more network interface 1007. In such an example, the computer system 1001-1 can transmit and/or receive information, for example, via the one or more networks 1009 (e.g., consider one or more of the Internet, a private network, a cellular network, a satellite network, etc.).

As an example, the computer system 1001-1 may receive from and/or transmit information to one or more other devices, which may be or include, for example, one or more of the computer systems 1001-2, etc. A device may be located in a physical location that differs from that of the computer system 1001-1. As an example, a location may be, for example, a processing facility location, a data center location (e.g., server farm, etc.), a rig location, a wellsite location, a downhole location, etc.

As an example, a processor may be or include a microprocessor, microcontroller, processor module or subsystem, programmable integrated circuit, programmable gate array, or another control or computing device.

As an example, the storage media 1006 may be implemented as one or more computer-readable or machine-readable storage media. As an example, storage may be distributed within and/or across multiple internal and/or external enclosures of a computing system and/or additional computing systems.

As an example, a storage medium or storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLU-RAY® disks, or other types of optical storage, or other types of storage devices.

As an example, a storage medium or media may be located in a machine running machine-readable instructions, or located at a remote site from which machine-readable instructions may be downloaded over a network for execution.

As an example, various components of a system such as, for example, a computer system, may be implemented in hardware, software, or a combination of both hardware and software (e.g., including firmware), including one or more signal processing and/or application specific integrated circuits.

As an example, a system may include a processing apparatus that may be or include a general purpose processors or application specific chips (e.g., or chipsets), such as ASICs, FPGAs, PLDs, or other appropriate devices.

Figure 11:
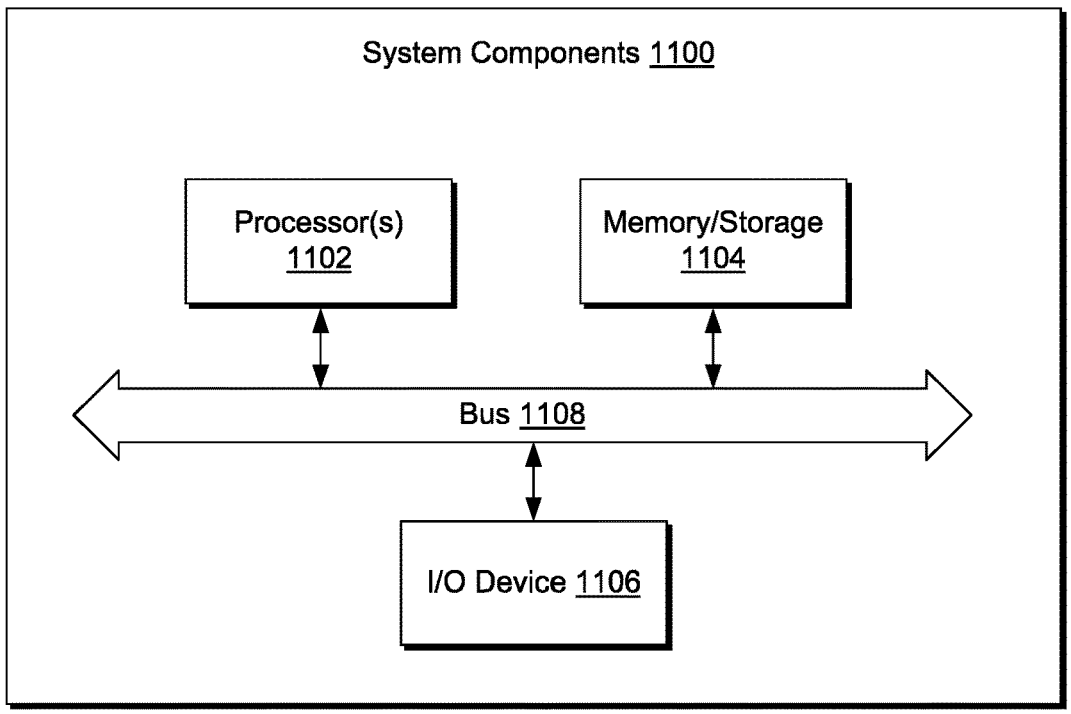
FIG. 11 illustrates example components of a system and a networked system.
Figure 11:
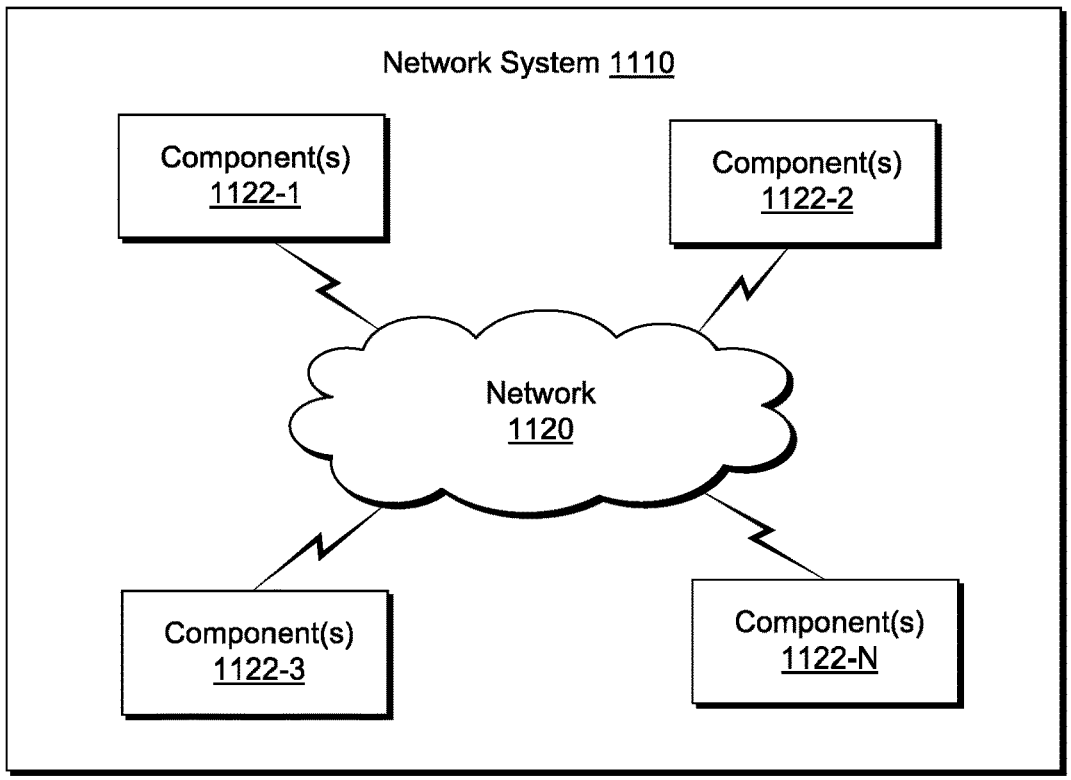

FIG. 11 shows components of a computing system 1100 and a networked system 1110. The system 1100 includes one or more processors 1102, memory and/or storage components 1104, one or more input and/or output devices 1106 and a bus 1108. According to an embodiment, instructions may be stored in one or more computer-readable media (e.g., memory/storage components 1104). Such instructions may be read by one or more processors (e.g., the processor(s) 1102) via a communication bus (e.g., the bus 1108), which may be wired or wireless. The one or more processors may execute such instructions to implement (wholly or in part) one or more attributes (e.g., as part of a method). A user may view output from and interact with a process via an I/O device (e.g., the device 1106). According to an embodiment, a computer-readable medium may be a storage component such as a physical memory storage device, for example, a chip, a chip on a package, a memory card, etc.

According to an embodiment, components may be distributed, such as in the network system 1110. The network system 1110 includes components 1122-1, 1122-2, 1122-3, . . . 1122-N. For example, the components 1122-1 may include the processor(s) 1102 while the component(s) 1122-3 may include memory accessible by the processor(s) 1102. Further, the component(s) 1122-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH®, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Offset Well Report Processing

Figure 12A:
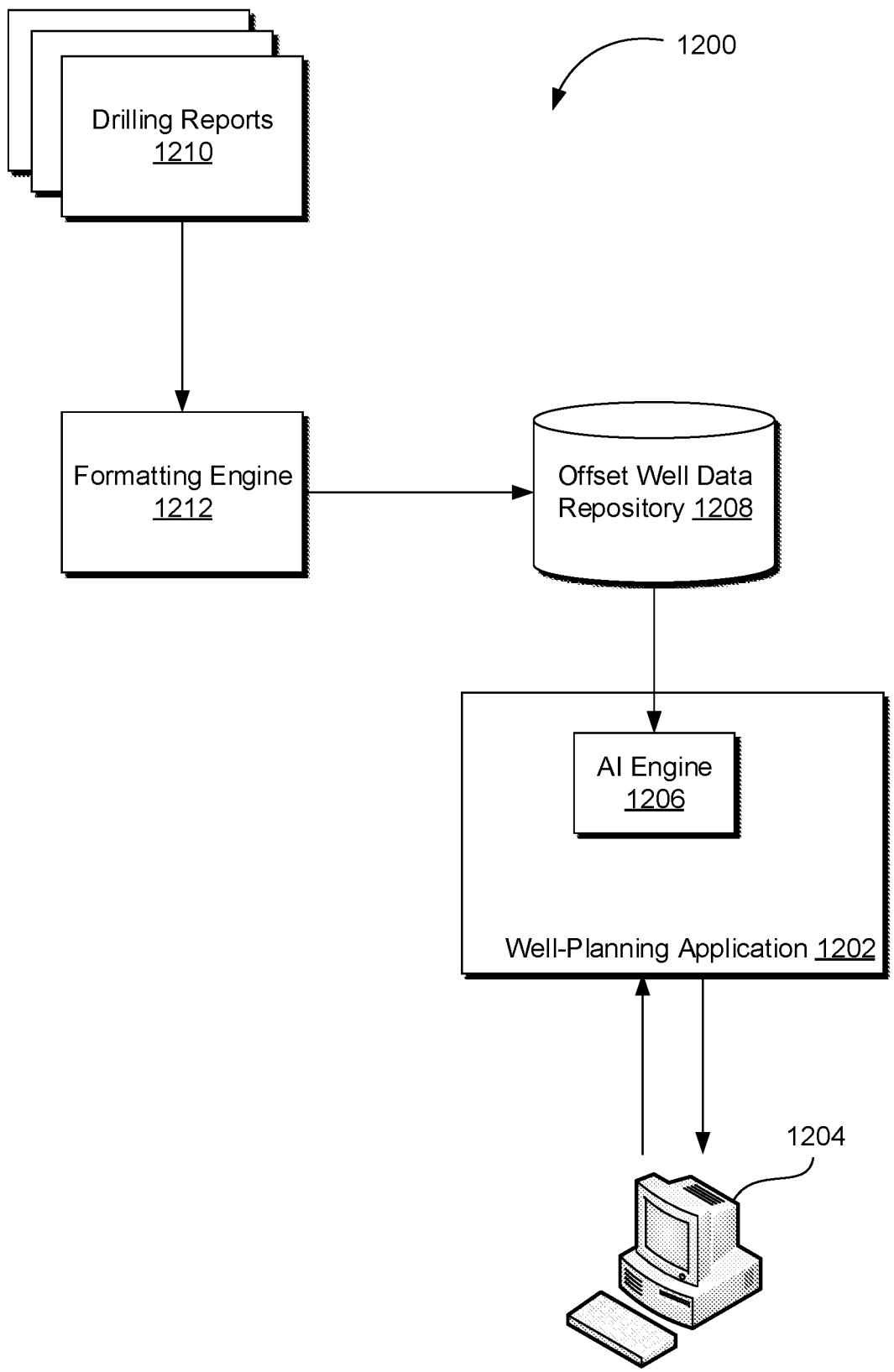
FIG. 12A illustrates an example of a well-planning system in which offset well drilling reports are analyzed.

Referring to FIG. 12A, there is shown a simplified, diagrammatic example of a well-planning system 1200 that may implement drilling event and drilling activity detection and extraction. The well-planning system 1200 may be implemented on one or more computer processors. The well-planning system 1200 may include a well-planning application 1202 configured to process information from a variety of sources to facilitate selecting a location, trajectory, and geometry for a planned well, as well as conduct risk assessment, non-productive time analysis, e.g., as described in one or more of the systems above. The well-planning application 1202 may also be configured to receive input from a user device 1204 and provide output thereto in support of this functionality.

The well-planning application 1202 may also include an artificial intelligence (AI) engine 1206. The AI engine 1206 may be configured to employ machine learning, of any variety, such as neural networks or supervised learning (e.g., support-vector machine), to name just two examples among many contemplated. The artificial intelligence engine 1206 may be trained to detect drilling events and drilling activities based at least in part on the text of one or more drilling reports.

Accordingly, the system 1200 may include a database, such as the illustrated offset well data repository 1208. The repository 1208 may store data from drilling reports 1210 that are formatted by a formatting engine 1212. The drilling reports 1210 may include text-based information recorded by drilling operators while drilling wells. The drilling reports 1210 may also include depth information, time information, etc., which may be correlated to the text-based information, in some embodiments. The drilling reports 1210 may also include drilling parameter information, which may be correlated with either or both of the text-based information and/or the depth information. Accordingly, the drilling reports 1210 may provide a description of the drilling process, activities, and circumstances, as well as a record of any events (e.g., hazards, non-productive time, etc.) experienced during drilling execution. The various embodiments described herein relate to the application of AI techniques to analyze drilling reports and the various events and activities that occur during drilling execution.

The formatting engine 1212 may extract the data from the drilling reports 1210 and place it into another format that can be scanned, searched, or otherwise processed by a computer and/or a human operator. For example, the formatting engine 1212 may perform an optical character recognition of imaged text data (e.g., a PDF), and then parse and/or aggregate the results into one or more spreadsheets, with any suitable set of fields. The formatting information (e.g., spreadsheets) may then be stored in the offset well data repository 1208. The AI engine 1206 may then access the formatted data in the repository 1208 so as to extract drilling events and drilling activities, as will be explained in greater detail below.

The formatting engine 1212 may also be used to identify "unusual" data, which may include text or other types of data that does not fit into the format seen in other drilling reports, e.g., from the same operator. The unusual data may be data that is additional to what is expected in the text field or otherwise data that does not readily fit into the prepared templates. The unusual data may thus have a high likelihood of indicating an observation of an unexpected event, e.g., a hazard, such as excessive drilling fluid loss, a stuck pipe, pressure kick, or the like. The unusual data might thus be flagged as a misfit to the template, and thus indicated as a drilling event, e.g., in the formatted data. This unusual data may be employed by the model 1250 to assist in identifying events in the offset well data.

Figure 12B:
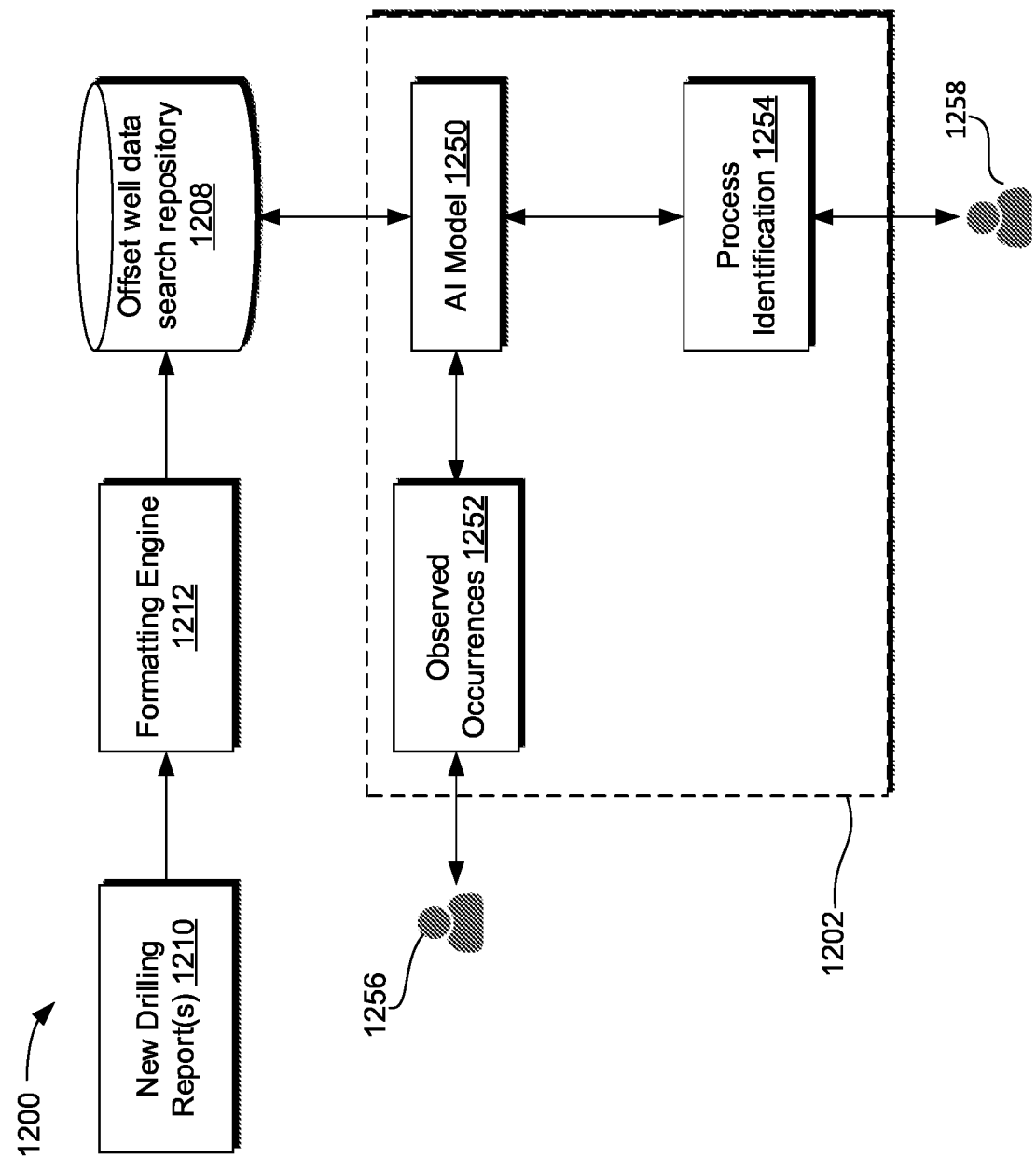
FIG. 12B illustrates an example of a workflow incorporating the well-planning system.

FIG. 12B illustrates a simplified, schematic view of a workflow for the system 1200, according to an embodiment. In the workflow, the system 1200 may receive one or more new drilling reports (e.g., as a batch), again as indicated at 1210. The formatting engine 1212 may process these drilling reports. For example, the formatting engine 1212 may perform an optical character recognition (and/or any other processing operations) and then parse the resulting data and use it to populate fields within a template. For example, the formatting engine 1212 may identify the drill depth start and end, drilling time start and end, and free text, etc. for entries in the drilling reports, where each drilling report may include one or several such entries.

The offset well data, once formatted, may be stored in the offset well data search repository 1208. The repository 1208 may be accessible to the well-planning application 1202. The well-planning application 1202 may be used to generate, or may otherwise be loaded with, an AI model 1250. For example, the AI engine 1206 (FIG. 12A) may be employed in order to generate and/or implement the AI model 1250. The AI model 1250 may be employed to predict events 1252 in the offset well data contained in the repository 1208. For example, once trained (training the AI model 1250 will be discussed in greater detail below), the AI model 1250 may identify events, e.g., loss of circulation fluids, stuck pipes, kicks, tight hole, other hazards, non-productive time, etc., that are documented in the offset well data in the repository 1208. In an embodiment, the AI model 1250 may be trained to identify certain groups of words, potentially in combination with other factors such as drilling parameters, in order to semantically identify such events. In some embodiments, the groups of words may be selected from the "unusual" data determined during the formatting.

Further, the AI model 1250 may be trained to identify drilling activities in the offset well data in the repository 1208, as at 1254. For example, based on identified groups of words in the text of the well data, potentially in combination with other factors (e.g., pressure, temperature, drilling depth advancement, operation category, duration, etc.), the AI model 1250 may identify certain drilling activities, such as drilling to depth or other activities not indicative of a hazardous or otherwise problematic or unexpected event.

The model 1250 may also include logic and may include application of an algorithm in order to link a grouping of words to a drilling event or activity. For example, the text data may include an observation that a certain amount of drilling fluid was lost. The drilling report may also specify a duration or any other parameter or characteristic associated with an observation of a drilling condition or event. The model 1250 may include logic to determine when such fluid loss (and/or fluid loss rate) is indicative of a particular hazard such as encountering formations that are inherently fractured, cavernous, or have high permeability, improper drilling conditions, or induced fractures caused by excessive downhole pressures. In order to make this determination, the model 1250 may consider drilling parameters, depth, wellbore geometry, formation properties, and anything else determined relevant, and make a decision based on these factors.

It will be appreciated that these are merely simplistic examples. More complex text groupings may be recognized, with increasing complexity (and/or length of the groupings) leading to increasing the range of similar word groupings that may be identified by the model. Further, more complicated logic may be applied, potentially in several stages, to arrive at a determination of a drilling event or activity from a group of words and/or other data recorded in a drilling report.

Various human operators can provide feedback that may be employed to further tune/train the AI model 1250. For example, an expert or end-user 1256 may provide feedback for identified events. In another example, an expert or end-user 1258 may provide feedback for the activity identification. The feedback may be employed, for example, to strengthen connections in the AI model 1250 between text and/or other parameters and an identified event/activity when the identification is confirmed, and/or to weaken, break, or otherwise modify connections in the AI model 1250 when the identification is indicated as being incorrect.

Figure 13:
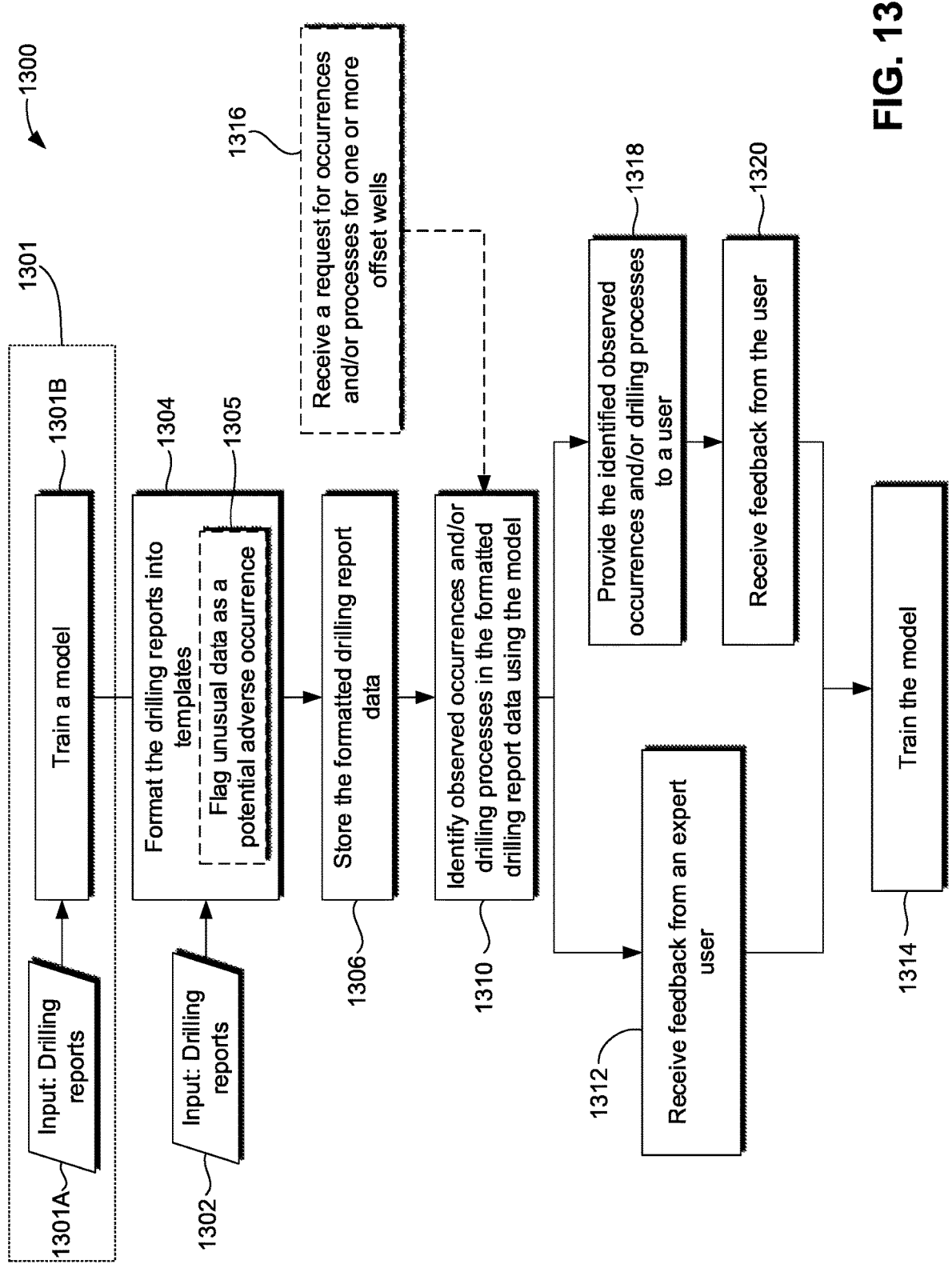
FIG. 13 illustrates a flowchart of an example of a method for identifying drilling events in drilling reports from offset wells.

FIG. 13 illustrates a flowchart of a method 1300 for extracting drilling events from drilling reports of offset wells, according to an embodiment. The method 1300 may include an initial training stage 1301. An example workflow for the initial training stage 1301 is shown in and described below with reference to FIG. 14. For purposes of FIG. 13, the initial training stage 1301 includes receiving one or more (e.g., a batch of) drilling reports 1301A, and training a model using the drilling reports, as at 1301B. The training at 1301B may be conducted at least partially by a human user, e.g., an expert or an end-user. The training at 1301 may also be conducted using formatted drilling report data, as discussed above.

The method 1300 may advance out of the initial training stage; however, even after the initial training stage, the model (e.g., model 1250, FIG. 12B) may continue to be trained, as will be appreciated from the following description. Continuing, the method 1300 may include receiving one or more (e.g., a batch of) drilling reports as input, as at 1302. The drilling reports, as noted above, may include numerical and text-based data, with the text-based data potentially being free-form, and/or may include other types of data such as drop-down menu selections, etc.

The method 1300 may include formatting the drilling reports into formatted drilling report data using templates, as at 1304. The formatting at 1304 may be accomplished automatically, e.g., by parsing the drilling reports into different data segments and storing the data segments in a logical order, e.g., corresponding to depth, an identifier associated with a well, a location of the well, etc. The formatted drilling report data may also include correlations related to drilling parameters, trajectory, well geometry, and any like information that may be employed to facilitate using the historical drilling reports to planned wells.

In an embodiment, formatting may proceed by scanning through and/or processing the drilling reports and parsing the data contained therein into fields of templates. The templates may specify the order and location of information frequently seen in the text section of the drilling reports. Further, a human user (e.g., an expert) may verify that the templates are accurate.

The method 1300 may proceed to storing the formatted drilling report data, as at 1306. For example, the formatted drilling report data may be stored in the repository 1208 (FIG. 12), which may be accessible to the well planning application 1202. The repository 1208 may be any form of persistent electronic memory accessible by a computer. The method 1300 may also include identifying drilling events in at least some of the formatted drilling report data using the model (e.g., the model that was initially trained at 1301B, and/or the model as refined/trained, as explained below), as at 1310. In an embodiment, the identification at 1310 may include recognizing one or more drilling activities that occur prior to an identified drilling event, and one or more drilling activities that occur subsequent to the drilling event. In particular, the method 1300 may include recognizing the sequence of activities that are executed leading up to an event, and what took place thereafter (this includes recognizing not only that the drilling events occurred, but also recognizing that the drilling activities took place before/after a certain event, which may indicate a causal relationship). This can facilitate planning for subsequent well activities. Further, this may facilitate determining why and how a drilling event took place, which may allow for enhanced planning and monitoring of future wells. This may also provide data points for studies on what to do in response to a drilling event, so as to facilitate determining mitigating/corrective actions to take in response thereto.

The method 1300 may then move to training the model. As indicated in the figure, there may be at least two training workflows in which the model may be employed: an offline training flow and an online training flow. In the offline case, a batch of drilling report data may be analyzed using the model 1250, and drilling events identified. The method 1300 may then provide the identifications to a separate identifier, e.g., an expert user and may receive feedback therefrom, as at 1312. It will be appreciated that the separate identifier could also be another AI engine, e.g., one already trained or otherwise considered more reliable. The feedback may take various forms, e.g., as a comparison of predictions to actual events/activities identified by the separate identifier (e.g., expert), a confirm/reject input from the separate identifier (e.g., expert) for individual events, etc. The model 1250 may thus be adjusted (trained) to reduce this error based on the feedback from the separate identifier, as at 1314. In adjusting the model 1250, links that are confirmed may be strengthened (e.g., increase in confidence), while links that are corrected may be diminished or removed (e.g., reduced in confidence).

In online training, the method 1300 receives a request for drilling events for one or more offset wells, as at 1316. This request may be in the form of a query, e.g., for wells in a certain proximity to a planned well. The difference (uncertainty) between wells generally decreases with increasing proximity, i.e., the nearer the offset well, the more likely it is that drilling the planned well will proceed similarly to the offset well. The proximity determination may, in some embodiments, be left to the user. In other embodiments, the user may specify other parameters, which may lead the method 1300 to identify wells in the drilling report data that satisfy the query.

In this "online" training case, the method 1300 may then provide the identified drilling events and activities to a user, as at 1318, receive feedback from the user, as at 1320, and then adjust (train) the model 1250 based on the feedback, as at 1314. For example, the drilling events may be paired with the text groupings that led to the identification, and thus the user may be able to confirm or correct the identification. The correctness of the user's confirmation/correction of the identification may be checked by another human expert, or may be assumed to be correct.

In training the model 1250 at 1314, the method 1300 may, for example, increase the confidence of predictions based on confirmation in the offline or online training use-case, and/or decrease the confidence of predictions based on corrections. In some embodiments, the identified events may be used, e.g., by a user, to conduct one or more analyses of a well plan, which may confirm a well plan or lead to its adjustment. For example, based on the identified drilling event, a user, e.g., using the well planning application 1202 may obtain a well plan analysis. The analysis may be obtained by one or more of: constructing a risk-stick chart, performing a non-productive time analysis, or conducting a Monte Carlo analysis of well time. Subsequent activities which may form part of the method 1300 may include drilling a well based on the adjusted well plan.

Figure 14:
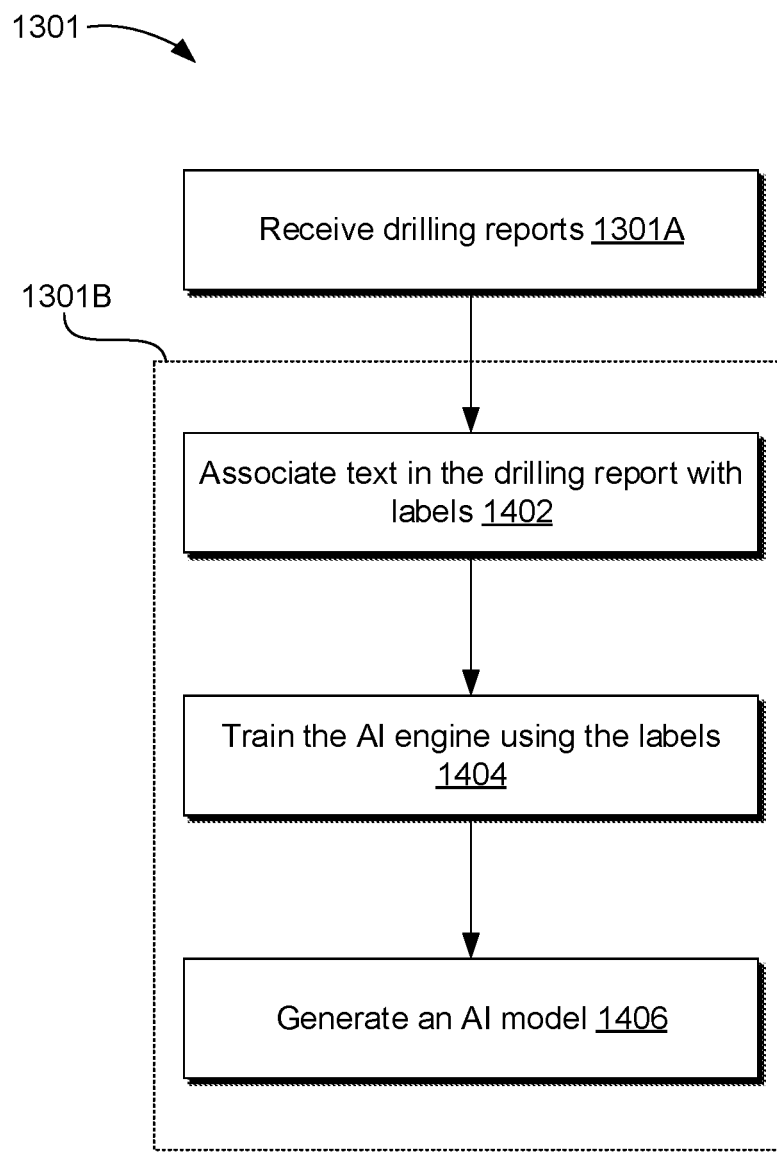
FIG. 14 illustrates a flowchart of an example of training a model as part of the method of FIG. 13.

FIG. 14 illustrates a workflow for the initial training stage 1301, according to an embodiment. As shown, the initial training stage 1301 may include receiving the one or more drilling reports, as at 1301A and also indicated in FIG. 13. The initial training stage 1301 may also include training the model 1250, as at 1301B, using the drilling reports. In some embodiments, the drilling reports received at 1301A may be formatted using the formatting engine prior to training at 1301B and stored in the repository 1208 (e.g., FIG. 12B).

In an embodiment, training the model 1250 may include associating text in the drilling report with labels or tags, as at 1402. The labels may correspond to drilling events and/or activities. The labels may be associated with the text, e.g., initially through a manual process of tagging the words by a human user. For example, the user may read a text entry indicating that complete loss of return fluid was observed at a certain depth. The user may highlight or otherwise select this text and tag the text as indicating lost circulation. Similar procedures may be applied for any tags relevant to events (e.g., hazards) that may be considered of interest in the model. Likewise, the user may associate various entries, whether text-based or not, with activity tags, indicating a normal drilling activity is observed/undertaken as indicated by a particular entry in a drilling log. Again, any number of tags indicating any relevant drilling activities may be employed.

The training at 1301B may then proceed to training the AI engine using the labels or tags, as at 1404. A variety of different types of machine-learning, artificial intelligence engines are known and any may be employed. Further, during such initial training/generating the model, an expert may examine each predicted activity/event, determine whether it is an accurate prediction, and provide feedback to train the model. This is similar to the offline training workflow discussed above. Thus, the AI engine may be trained in any way suitable, to generate and train a model 1250, as at 1406, to identify groups of words that are the same as, similar to, or refer to a same type of event or activity, and predict the event or activity therefrom.

Although only a few examples have been described in detail above, those skilled in the art will readily appreciate that many modifications are possible in the examples. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words "means for" together with an associated function.

What is claimed is:

1. A method for identifying drilling events in drilling reports, comprising:
   receiving one or more drilling reports comprising text data representing one or more observations recorded during drilling activity;
   identifying a drilling event, a drilling activity, or both from a portion of the text data using a model framework, wherein the portion of the text data does not conform to an expected format of the model framework and wherein the model framework comprises a machine learning model;
   obtaining feedback based at least in part on the identified drilling event, drilling activity, or both, wherein the feedback depends on a comparison of predicted to identified drilling events, drilling activities, or both to label an unexpected, identified drilling event, drilling activity, or both, with a label or labels;
   training the machine learning model based on the label or labels to generate a trained machine learning model;
   implementing the model framework with the trained machine learning model during execution of a planning application that plans drilling of a target well to search a database of offset well drilling reports to generate search results; and
   generating a plan for drilling of the target well via the execution of the planning application using at least a portion of the search results.

2. The method of claim 1, wherein identifying identifies a drilling event and further comprising:
   recognizing a first drilling activity that occurs before the identified drilling event;
   recognizing a second drilling activity that occurs after the identified drilling event; and
   conducting an analysis of events that occurred before the identified drilling event, based in part on the first drilling activity, and an analysis of events that occurred after the identified drilling event, based in part on the second activity.

3. The method of claim 1, wherein identifying the drilling event, drilling activity, or both from the portion of the text data comprises:
   identifying a group of words in the portion of the text data as corresponding to a specific drilling event or a specific drilling activity; and
   wherein the training comprises linking the group of words to the specific drilling event or the specific drilling activity to generate the trained machine learning model.

4. The method of claim 1, wherein training the machine learning model comprises:
   increasing a confidence of one or more links of the machine learning model between a group of words and the identified drilling event, drilling activity, or both when the feedback comprises a confirmation based on the comparison being an acceptable comparison of the predicted and identified drilling events, drilling activities, or both; and
   decreasing a confidence of one or more links of the machine learning model between a group of words and the identified drilling event, drilling activity, or both when the feedback comprises a correction based on the comparison being an unacceptable comparison of the predicted and identified drilling events, drilling activities, or both.

5. The method of claim 1, further comprising:
   based on the identified drilling event, drilling activity, or both, analyzing a well plan to obtain a well plan analysis, wherein the analyzing comprises one or more of:
   constructing a risk-stick chart, performing a non-productive time analysis, or conducting a Monte Carlo analysis of well time; and
   adjusting the well plan based on the well plan analysis.

6. A computing system, comprising:
one or more processors; and
a memory system comprising one or more non-transitory, computer-readable media storing instructions that, when executed by at least one of the one or more processors, cause the computing system to perform operations, the operations comprising:
   receiving one or more drilling reports comprising text data representing one or more observations recorded during drilling activity;
   identifying a drilling event, a drilling activity, or both from a portion of the text data using a model framework, wherein the portion of the text data does not conform to an expected format of the model framework and wherein the model framework comprises a machine learning model;
   obtaining feedback based at least in part on the identified drilling event, drilling activity, or both, wherein the feedback depends on a comparison of predicted to identified drilling events, drilling activities, or both to label an unexpected, identified drilling event, drilling activity, or both, with a label or labels;
   training the machine learning model based on the label or labels to generate a trained machine learning model;
   implementing the model framework with the trained machine learning model during execution of a planning application that plans drilling of a target well to search a database of offset well drilling reports to generate search results; and
   generating a plan for drilling of the target well via the execution of the planning application using at least a portion of the search results.

7. The system of claim 6, wherein identifying identifies a drilling event and wherein the operations further comprise:
   recognizing a first drilling activity that occurs before the identified drilling event;
   recognizing a second drilling activity that occurs after the identified drilling event; and
   conducting an analysis of events that occurred before the identified drilling event, based in part on the first drilling activity, and an analysis of events that occurred after the identified drilling event, based in part on the second activity.

8. The system of claim 6, wherein identifying the drilling event, drilling activity, or both from the portion of the text data comprises:

identifying a group of words in the portion of the text data as corresponding to a specific drilling event or a specific drilling activity; and wherein the training comprises linking the group of words to the specific drilling event or the specific drilling activity to generate the trained machine learning model.

9. The system of claim 6, wherein training the machine learning model comprises:

increasing a confidence of one or more links of the machine learning model between a group of words and the identified drilling event, drilling activity, or both when the feedback comprises a confirmation based on the comparison being an acceptable comparison of the predicted and identified drilling events, drilling activities, or both; and decreasing a confidence of one or more links of the machine learning model between a group of words and the identified drilling event, drilling activity, or both when the feedback comprises a correction based on the comparison being an unacceptable comparison of the predicted and identified drilling events, drilling activities, or both.

10. The system of claim 6, wherein the operations further comprise:

based on the identified drilling event, drilling activity, or both, analyzing a well plan to obtain a well plan analysis, wherein the analyzing comprises one or more of:

constructing a risk-stick chart, performing a non-productive time analysis, or conducting a Monte Carlo analysis of well time; and adjusting the well plan based on the well plan analysis.

11. A non-transitory, computer-readable medium storing instructions that, when executed by at least one processor of a computing system, cause the computing system to perform operations, the operations comprising:

receiving one or more drilling reports comprising text data representing one or more observations recorded during drilling activity;

identifying a drilling event, a drilling activity, or both from a portion of the text data using a model framework, wherein the portion of the text data does not conform to an expected format of the model framework and wherein the model framework comprises a machine learning model;

obtaining feedback based at least in part on the identified drilling event, drilling activity, or both, wherein the feedback depends on a comparison of predicted to identified drilling events, drilling activities, or both to label an unexpected, identified drilling event, drilling activity, or both, with a label or labels;

training the machine learning model based on the label or labels to generate a trained machine learning model;

implementing the model framework with the trained machine learning model during execution of a planning application that plans drilling of a target well to search a database of offset well drilling reports to generate search results; and generating a plan for drilling of the target well via the execution of the planning application using at least a portion of the search results.

12. The non-transitory, computer-readable medium of claim 11, wherein identifying identifies a drilling event and wherein the operations further comprise:

recognizing a first drilling activity that occurs before the identified drilling event;

recognizing a second drilling activity that occurs after the identified drilling event; and conducting an analysis of events that occurred before the identified drilling event, based in part on the first drilling activity, and an analysis of events that occurred after the identified drilling event, based in part on the second activity.

* * * * *